US012478993B2

(12) United States Patent
Lutz et al.

(10) Patent No.: US 12,478,993 B2
(45) Date of Patent: Nov. 25, 2025

(54) PAINT-SPRAYING DEVICE FOR PRODUCING A PAINT SPRAY JET AND METHOD FOR VENTING A PAINT CONTAINER

(71) Applicant: J. WAGNER GmbH, Markdorf (DE)

(72) Inventors: Magnus Lutz, Salem (DE); Peter Ibele, Horgenzell (DE); Holger Stohl, Markdorf (DE)

(73) Assignee: J. WAGNER GmbH, Markdorf (DE)

( * ) Notice: Subject to any disclaimer, the term of this patent is extended or adjusted under 35 U.S.C. 154(b) by 278 days.

(21) Appl. No.: 18/247,925

(22) PCT Filed: Oct. 8, 2021

(86) PCT No.: PCT/EP2021/077803
§ 371 (c)(1),
(2) Date: Apr. 5, 2023

(87) PCT Pub. No.: WO2022/074173
PCT Pub. Date: Apr. 14, 2022

(65) Prior Publication Data
US 2023/0372955 A1 Nov. 23, 2023

(30) Foreign Application Priority Data
Oct. 9, 2020 (DE) ..................... 10 2020 126 477.1

(51) Int. Cl.
*B05B 7/24* (2006.01)
*B05B 1/30* (2006.01)

(52) U.S. Cl.
CPC ............ *B05B 7/241* (2013.01); *B05B 1/3046* (2013.01); *B05B 7/2416* (2013.01)

(58) Field of Classification Search
CPC ... B05B 7/2478; B05B 7/2408; B05B 7/2405; B05B 9/03; B05B 7/066; B05B 7/241; B05B 1/3046; B05B 7/2416
(Continued)

(56) References Cited

U.S. PATENT DOCUMENTS

| | | | |
|---|---|---|---|
| 1,899,749 | A | 2/1933 | Simon |
| 3,090,530 | A | 5/1963 | Peeps |

(Continued)

FOREIGN PATENT DOCUMENTS

| | | | |
|---|---|---|---|
| DE | 10208861 | A1 | 9/2003 |
| DE | 102016107465 | A1 | 10/2017 |
| EP | 0847809 | A1 | 6/1998 |

OTHER PUBLICATIONS

International Search Report and Written Opinion for International Patent Application No. PCT/EP2021/077803, mailing date of Feb. 8, 2022, 14 pages with English Translation.

(Continued)

*Primary Examiner* — Len Tran
(74) *Attorney, Agent, or Firm* — Christopher J. Volkmann; KELLY, HOLT & CHRISTENSON PLLC

(57) ABSTRACT

A paint-spraying device for generating a paint spray jet, wherein the paint-spraying device comprises a front end and a back end, wherein the front end and the back end are connected to one another such that they can be separated by virtue of the back end and the front end being pulled apart, wherein the paint-spraying device comprises a paint container, wherein the paint container comprises an air feed line that leads into the paint container, wherein the air feed line comprises a check valve, wherein the paint-spraying device comprises an air discharge line that is connected to the paint container, and the air discharge line comprises a shut-off
(Continued)

valve by means of which the air discharge line is closed off during the operation of the paint-spraying device.

15 Claims, 19 Drawing Sheets

(58) Field of Classification Search
USPC .......................................................... 239/302
See application file for complete search history.

(56) References Cited

U.S. PATENT DOCUMENTS

| | | | | | |
|---|---|---|---|---|---|
| 4,184,778 | A * | 1/1980 | Terrels | B01F 35/00 366/250 |
| 5,052,623 | A * | 10/1991 | Nordeen | B05B 7/2472 239/305 |
| 2011/0114749 | A1* | 5/2011 | Munn | B05B 12/008 239/74 |
| 2011/0114758 | A1 | 5/2011 | Munn | |
| 2017/0304853 | A1 | 10/2017 | Krayer | |

OTHER PUBLICATIONS

International Preliminary Report on Patentability for International Patent Application No. PCT/EP2021/077803, date of issuance: Mar. 28, 2023, 10 pages with English Translation.
Office Action for Chinese Patent Application No. 202180082410.3, dated Sep. 10, 2025, 7 pages.

* cited by examiner

PAINT-SPRAYING DEVICE FOR PRODUCING A PAINT SPRAY JET AND METHOD FOR VENTING A PAINT CONTAINER

CROSS-REFERENCES TO RELATED APPLICATIONS

This application is a Section 371 National Stage Application of International Application No. PCT/EP2021/077803, filed Oct. 8, 2021, and published as WO 2022/074173A1 on Apr. 14, 2022, and claims priority to German Application No. 10 2020 126 477.1, filed Oct. 9, 2020, the contents of each are hereby incorporated by reference in their entirety.

DETAILED DESCRIPTION

Figure 1:
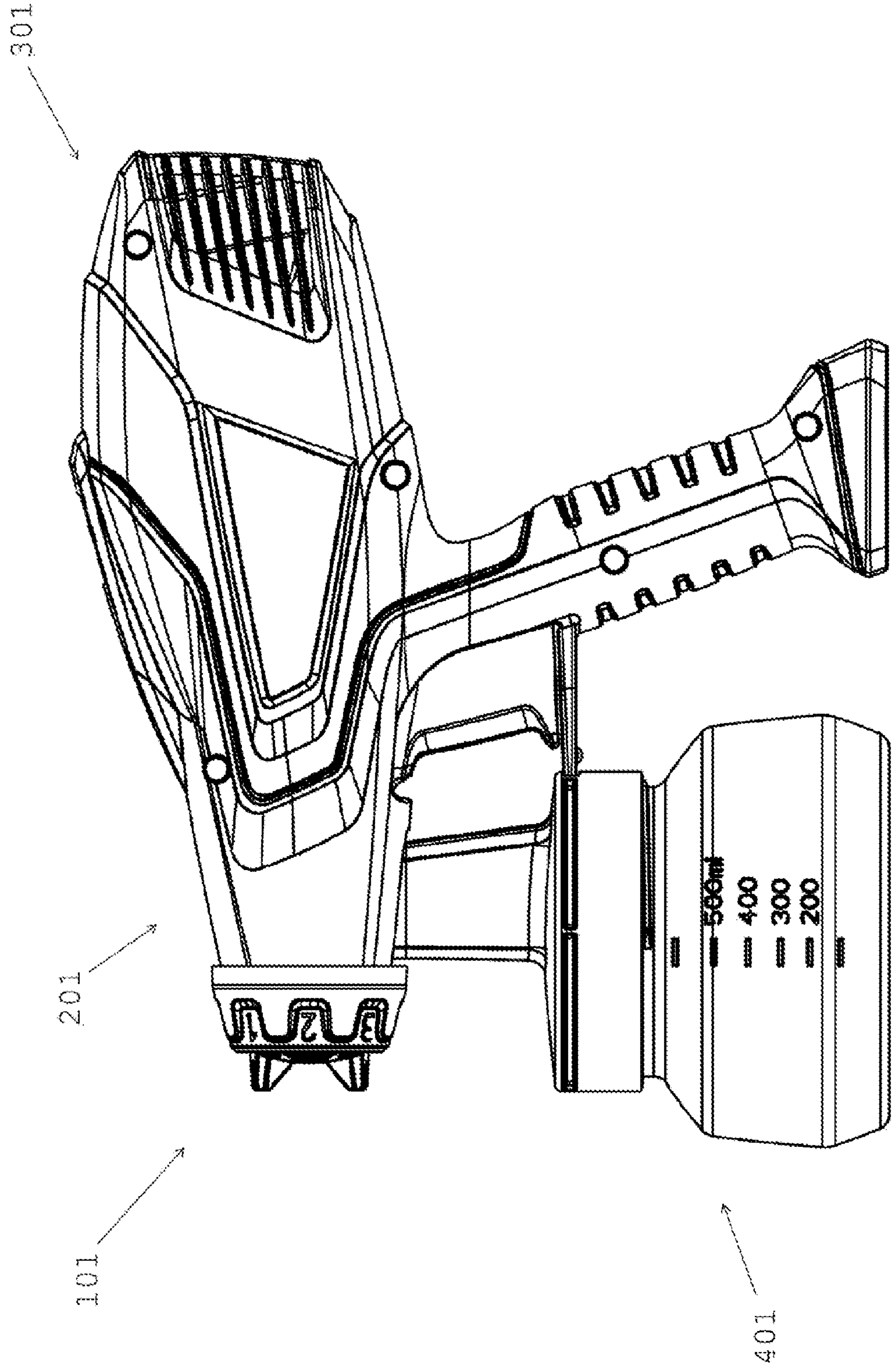
FIGS. 1-3 show a paint-spraying device according to one example in a side view, a sectional side view and an exploded view.

The present disclosure relates to a paint-spraying device for generating a paint spray jet, as per the preamble of claim 1, to a method for ventilating a paint container of a paint-spraying device, as per the preamble of claim 5, and to a paint-spraying device, as per the preamble of claim 6.

DE 10 2016 107 465 A1 has disclosed a paint-spraying device for generating a paint spray jet, wherein the paint-spraying device comprises a front end and a back end, wherein the front end and the back end are connected to one another such that they can be separated by virtue of the back end and the front end being pulled apart, wherein the paint-spraying device comprises a paint container, wherein the paint container comprises an air feed line that leads into the paint container, and wherein the air feed line comprises a check valve.

The present disclosure is based on the object of developing a paint-spraying device which allows a reliable build-up of positive pressure in a paint container, but which, when the paint-spraying device is dismantled, prevents an uncontrolled escape of a positive pressure that prevails in an interior space of the paint container after operation, and also a possible resulting undesired escape of paint. It is also an object of the present disclosure to propose a method for the controlled ventilation of the paint container. Finally, it is also an object of the present disclosure to design a dismantlable paint spray gun such that, despite its ability to be dismantled, it forms a stable and compact unit when assembled.

Proceeding from the features of the preambles of claims 1 and 5 and 6, respectively, said object is achieved by means of the characterizing features of claims 1 and 5 and 6, respectively. Advantageous and expedient refinements with respect to claims 1 and 6 are specified in the respective subclaims.

The paint-spraying device according to one example for generating a paint spray jet comprises a front end and a back end, wherein the front end and the back end are connected to one another such that they can be separated by virtue of the back end and the front end being pulled apart, wherein the paint-spraying device comprises a paint container, wherein the paint container comprises an air feed line that leads into the paint container, wherein the air feed line comprises a check valve, wherein the paint-spraying device comprises an air discharge line that is connected to the paint container, and wherein the air discharge line comprises a shut-off valve, configured in particular as a slide valve, by means of which the air discharge line is closed off during the operation of the paint-spraying device. In this way, despite the presence of an air discharge line, it is ensured that a positive pressure can be reliably built up in the paint container during the operation of the paint-spraying device, which positive pressure is required for conveying paint that is present in the paint container.

Provision is furthermore made whereby the shut-off valve comprises a valve housing and a closure, wherein the valve housing of the shut-off valve is formed by the front end and wherein the closure of the shut-off valve is formed by the back end. By means of such a construction, it is avoided that the number of components of the paint-spraying device is not increased, or is increased only insignificantly, by the shut-off valve. Furthermore, in this way, the assembly and disassembly of the paint-spraying device remains straightforward, because the number of components of the paint-spraying device is not increased, or is increased only insignificantly. It is self-evidently also possible for the valve housing to be formed by the back end and for the closure to be formed by the front end.

Provision is also made whereby the shut-off valve is closed when the back end has been inserted into the front end, and the shut-off valve is open when the back end has been pulled out of the front end. In this way, no additional handling step is required to open and close the shut-off valve. Rather, the shut-off valve is automatically opened during disassembly and is automatically closed during assembly.

Provision is furthermore made whereby the front end receives a paint nozzle module that comprises a nozzle element, a needle and a pressure spring and in particular a seal, wherein the back end receives a plunger, a bracing spring and a trigger, wherein the bracing spring is stronger than the pressure spring, and the needle is forced by means of the plunger into a closed position, in which the needle closes a nozzle opening of the nozzle element, when the back end has been inserted into the front end, wherein the needle is forced by the pressure spring into an open position, in which the nozzle opening of the nozzle element is opened up by the needle, when the back end has been pulled out of the front end, and wherein a spring travel of the bracing spring and the plunger are dimensioned such that, as the back end and the front end are pulled apart, the needle remains in the closed position until the shut-off valve is open. In this way, through simple mechanical interaction of components of the paint-spraying device, it is ensured that, as the paint-spraying device is disassembled, for example for the purposes of cleaning, the positive pressure that is present in the paint container can firstly escape before the progressing separation of front end and back end has an effect on the closing behavior of the needle. It is thus ensured that the positive pressure is not dissipated past the needle, resulting in an undesired escape of paint.

The method according to one example for ventilating a paint container of a paint-spraying device for generating a paint spray jet provides that the paint-spraying device comprises a front end and a back end, and the front end and the back end are connected to one another such that they can be separated by virtue of back end and front end being pulled apart, comprising the steps:

- pulling the back end and the front end apart by a first distance such that a shut-off valve, which is formed by the front end as a valve housing and by the back end as a closure, is at least partially opened,
- pulling the back end and the front end apart further by a further distance such that a needle, which is received in the front end and which closes a nozzle opening of a nozzle element, is released from the back end.

In this way, through simple mechanical interaction of components of the paint-spraying device, it is ensured that, as the paint-spraying device is disassembled, for example for the purposes of cleaning, the positive pressure that is present in the paint container can firstly escape before the progressing separation of front end and back end has an effect on the closing behavior of the needle. It is thus ensured that the positive pressure is not dissipated pass the needle, resulting in an undesired escape of paint.

The paint-spraying device according to one example for generating a paint spray jet, which paint-spraying device is in particular also configured as claimed in at least one of claims 1 to 4, comprises a front end, a back end and a paint nozzle module, wherein the back end comprises a main element, wherein the main element comprises an outer flange and a receiving flange, wherein the front end comprises a main element, wherein the main element comprises an outer flange and an inner flange, wherein the paint nozzle module is received by the inner flange, and wherein the outer flange of the main element of the front end is received by the receiving flange of the main element of the back end such that the front end together with the paint nozzle module is guided displaceably, in a manner secured against rotation, in the receiving flange counter to a pressure force exerted on a needle of the paint nozzle module by a plunger, and is fixed in a manner dependent on a rotational position of a sleeve nut that is screwed onto a thread that forms the outer flange. The multiple connection of the front end and back end by way of the paint nozzle module, and the combination of the sleeve nut and thread of the outer flange, have the effect that the front end and back end are optimally held together.

Provision is furthermore made whereby the sleeve nut bears against the main element of the front end via an air cap, and a bracing force introduced by the sleeve nut is transmitted via the inner flange to the paint nozzle module and the needle thereof such that said bracing force acts as an opposing force in relation to the pressure force of the plunger. In this way, the preload on the needle can be controlled using the sleeve nut.

Provision is also made whereby the paint nozzle module is received in a receiving space, which is surrounded by the inner flange, such that the paint nozzle module is aligned with a longitudinal axis of the main element of the front end by centering means of the front end, the paint nozzle module bears by way of a collar against stop means of the main element of the front end in a spraying direction, and the paint nozzle module is secured against rotation on the centering means by guide means. It is thus ensured that, even after disassembly and subsequent assembly, the paint nozzle module assumes its original alignment with respect to the front end again, thus avoiding a situation in which, after assembly, the paint nozzle module sprays in a direction that deviates from a previous spraying direction, and therefore no familiarization is necessary on the part of a user.

Provision is furthermore made whereby the centering means are formed by at least two and in particular three webs which are aligned with the longitudinal axis of the front end and which project into the receiving space, the stop means of the front end are formed by rear surfaces of the webs, and the guide means of the paint nozzle module are formed by at least one groove in which one of the webs is received. Such structures exhibit a long service life and can be produced easily by injection molding.

Provision is also made whereby the main element of the front end comprises a container flange, wherein a paint container of the paint-spraying device is screwed into the container flange of the front end. A structurally simple design of the paint-spraying device is thus ensured.

Provision is furthermore made whereby the main element of the front end comprises a liquid flange, wherein the liquid flange comprises a sealing surface and a paint feed opening that is surrounded by the sealing surface, wherein the sealing surface is arranged in the region of the inner flange such that the sealing surface of the liquid flange bears against a lateral surface of the nozzle element of the paint nozzle module and the paint feed opening is situated opposite a shell opening of the nozzle element of the paint nozzle module. In this way, a direct supply to the paint nozzle module is possible via the front end, such that there is no need for additional components that lead from the front end to the paint nozzle module in order to supply paint to the latter.

Provision is also made whereby the back end comprises a valve component and in that the front end comprises a valve component, the components together form a shut-off valve, and a position that the components assume relative to one another is determined by the rotational position of the sleeve nut, and therefore a degree of opening of the shut-off valve is determined by the rotational position of the sleeve nut. In this way, both a ventilation of the paint container, that is to say an opening of the shut-off valve, and a closure of the shut-off valve are possible in targeted fashion.

Provision is furthermore made whereby the shut-off valve is open, and pressure can escape from the paint container into the surroundings, when the sleeve nut has been loosened, and the shut-off valve is closed when the sleeve nut has been tightened. In this way, intuitively correct handling of the paint-spraying device during disassembly is ensured.

Provision is also made whereby, as the sleeve nut is loosened, the shut-off valve opens before the loosening of the sleeve nut brings about a movement of the needle that causes a nozzle opening of the paint nozzle module to be opened. This, too, ensures intuitively correct handling of the paint-spraying device during disassembly.

Finally, provision is made whereby the riser pipe is configured to be of such a length that, when the paint container has been screwed into the container flange of the front end, the riser pipe extends to or into the paint infeed of the paint nozzle module such that the paint nozzle module and the riser pipe are connected to one another in liquid-tight fashion in order to conduct paint. By virtue of paint being supplied in such a direct manner to the paint nozzle module, the number of joints that have to be made liquid-tight is reduced to a minimum.

In the context of the present disclosure, a front end is to be understood to mean a module of a paint-spraying device which comprises an air cap, wherein the paint-spraying device is configured in particular as an HVLP paint-spraying device.

In the context of the present disclosure, a back end is to be understood to mean a module of a paint-spraying device which is arranged behind the front end in relation to a spraying direction, wherein the back end is connected to the front end for the operation of the paint-spraying device, and wherein the paint-spraying device is configured in particular as an HVLP paint-spraying device.

Further details of the present disclosure will be described in the drawing on the basis of schematically illustrated exemplary embodiments.

Figure 2:
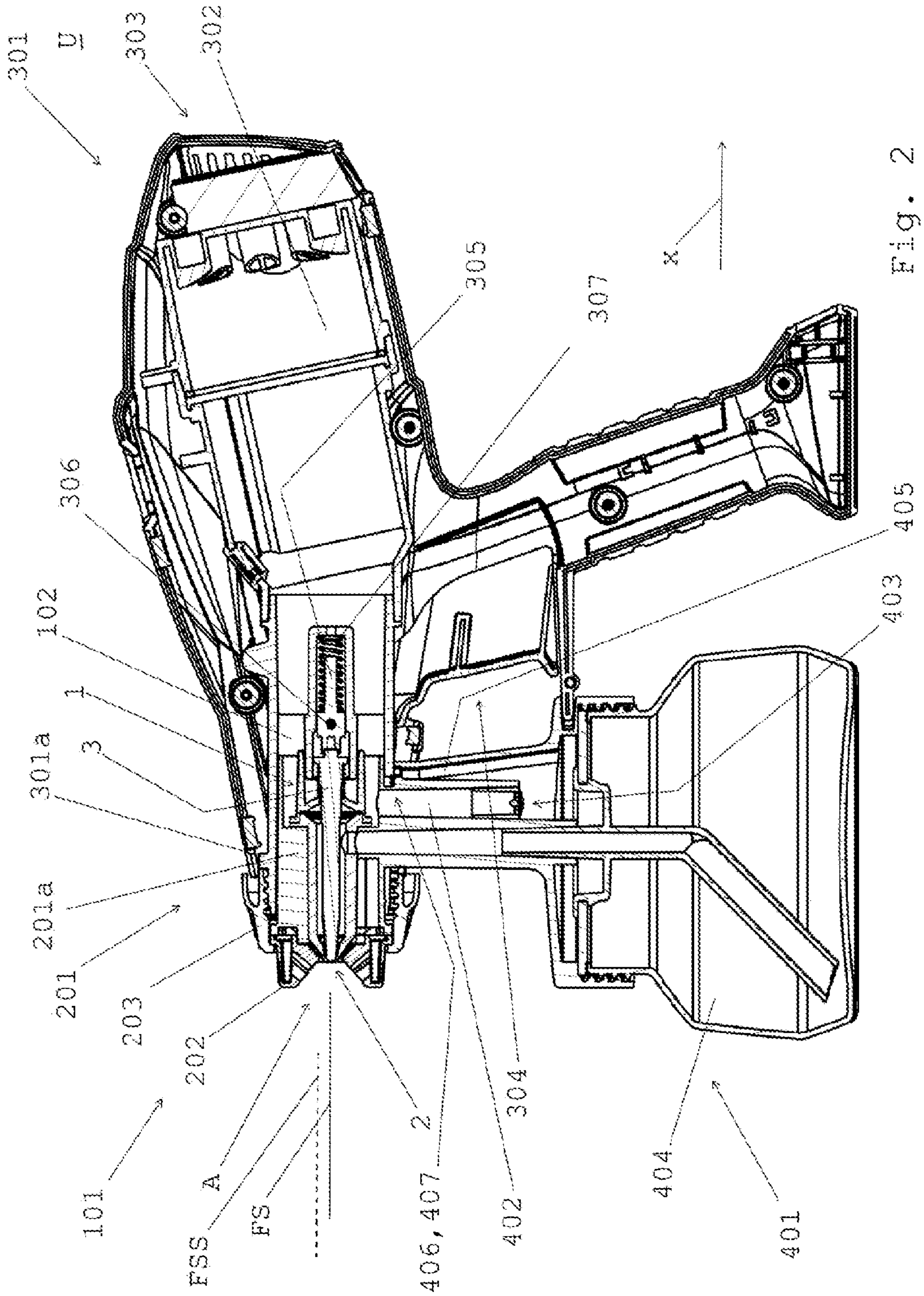
Figure 3:
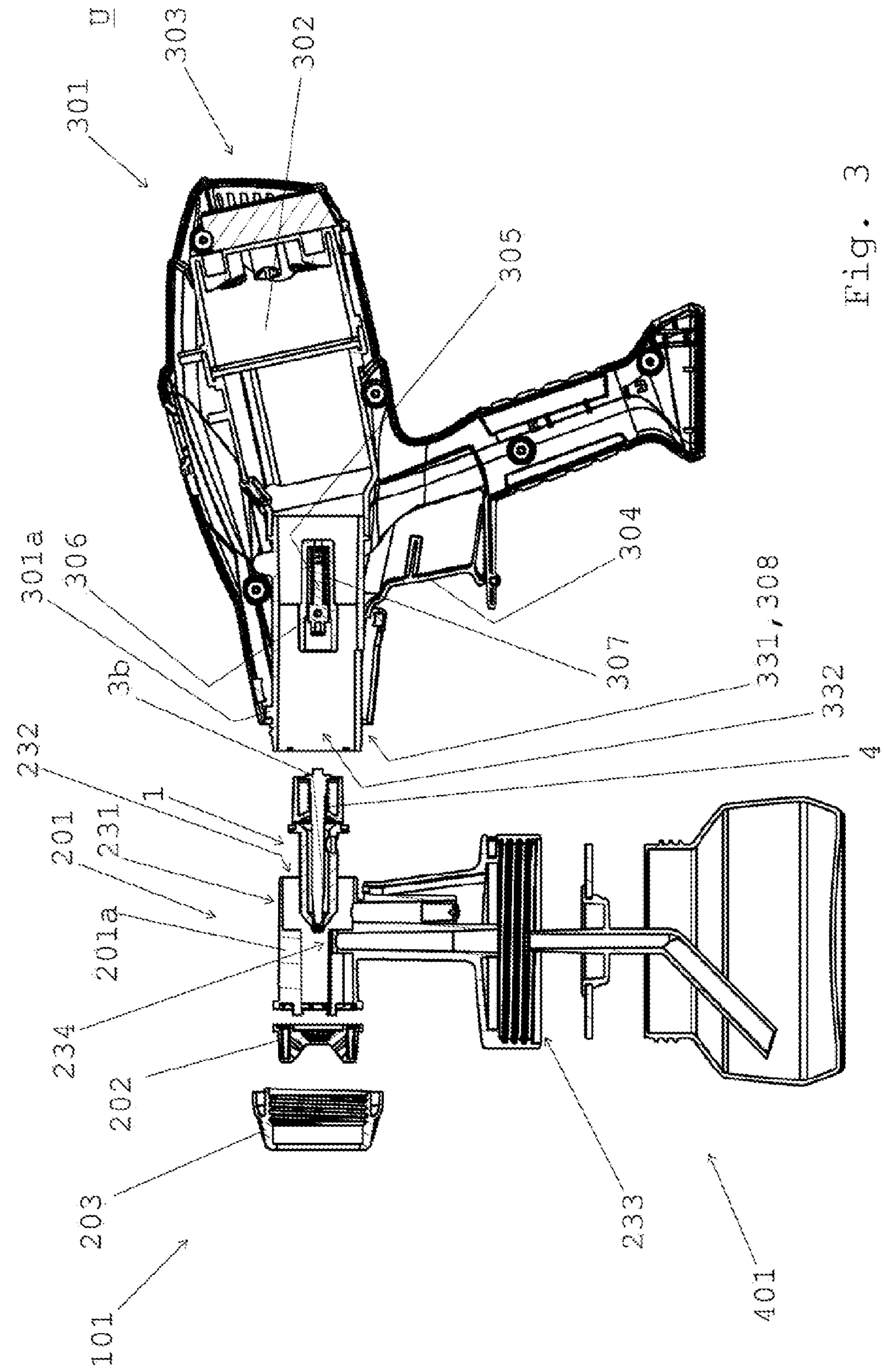

FIGS. 1-3 show a paint-spraying device 101 according to one example in a side view, a sectional side view and an exploded view. The paint-spraying device 101 comprises a front end 201, a back end 301, a paint container 401 and a paint nozzle module 1 that is received between the front end 201 and the back end 301.

It can be seen from the exploded illustration of FIG. 3 that the paint nozzle module 1 is received between the front end 201 and the back end 301, wherein, during assembly, the paint nozzle module 1 is firstly inserted into the front end 201 as far as a stop, and the front end 201 is then pushed together with the paint nozzle module 1 into the back end 301.

The front end 201 also comprises an air cap 202 and a sleeve nut 203. After the back end 301 has been pushed into the front end 201 equipped with the paint nozzle module 1, the front end 201 and the back end 301 are screwed together by means of the sleeve nut 203 with the interposition of the air cap 202. The paint container 401 may be screwed into the front end 201 before or after the described assembly process.

The back end 301 comprises an electric blower 302 (not illustrated in any more detail) by means of which air is drawn in from the surroundings U via inlets 303 and is blown in the direction of the front end 201, such that the air is blown around the paint nozzle module 1, and in this case past the paint nozzle module 1, via the air cap 202 such that, during operation, in accordance with the HVLP spraying method, said air passes into the surroundings U again together with a schematically illustrated paint jet FS emerging from the paint nozzle module 1, and forms a paint spray jet FSS therewith.

The back end 301 furthermore comprises a trigger 304. This acts, via a mechanism which is not illustrated, on a transverse bolt 306 that is connected to a spring-loaded plunger 305, such that the spring-loaded plunger 305 can be retracted counter to a bracing spring 307 by means of the trigger 304.

Figure 5B:
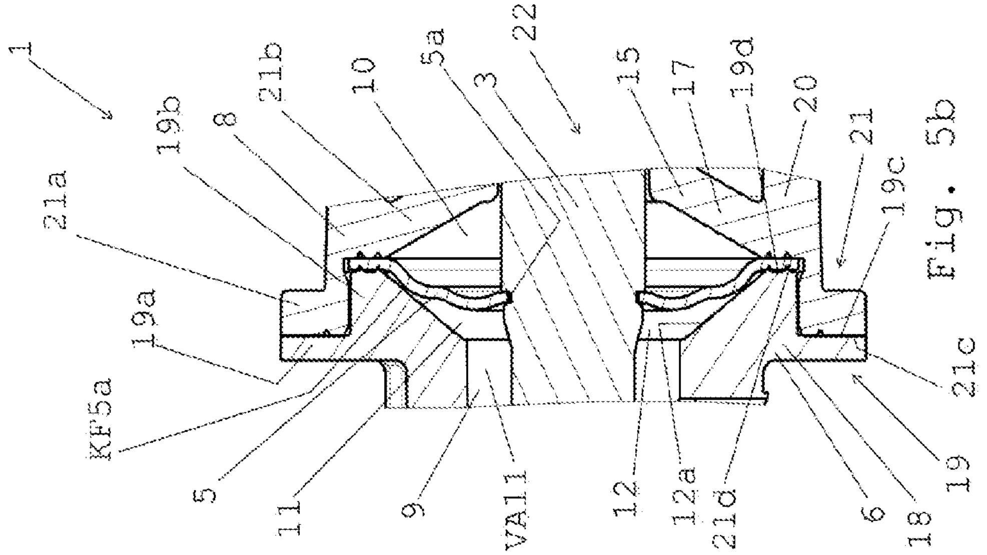
FIGS. 5*a* and 5*b* show a sectional side view of the paint nozzle module shown in FIG. 4, with the nozzle opening closed, and a detail view in the region of the seal.
Figure 5A:
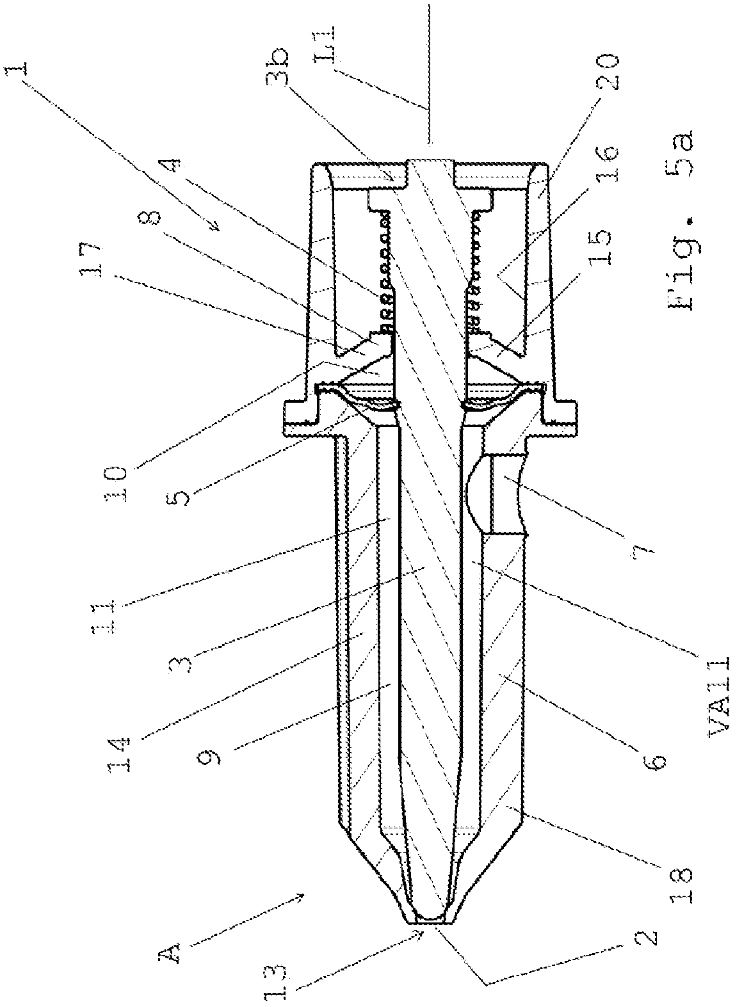
Figure 7B:
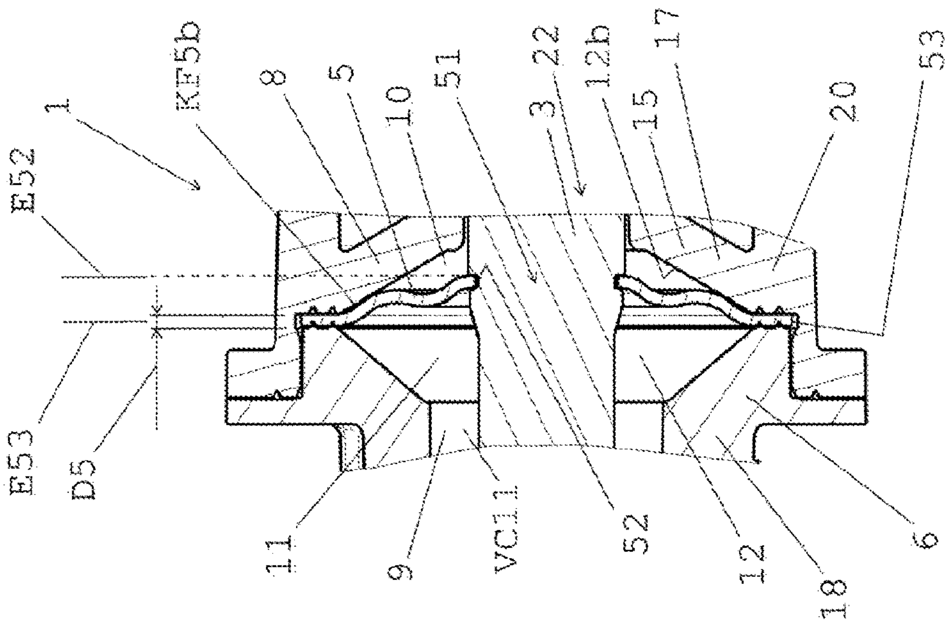
FIGS. 7*a* and 7*b* show a sectional side view of the paint nozzle module shown in FIG. 4, with the nozzle opening open, and a detail view in the region of the seal.
Figure 7A:
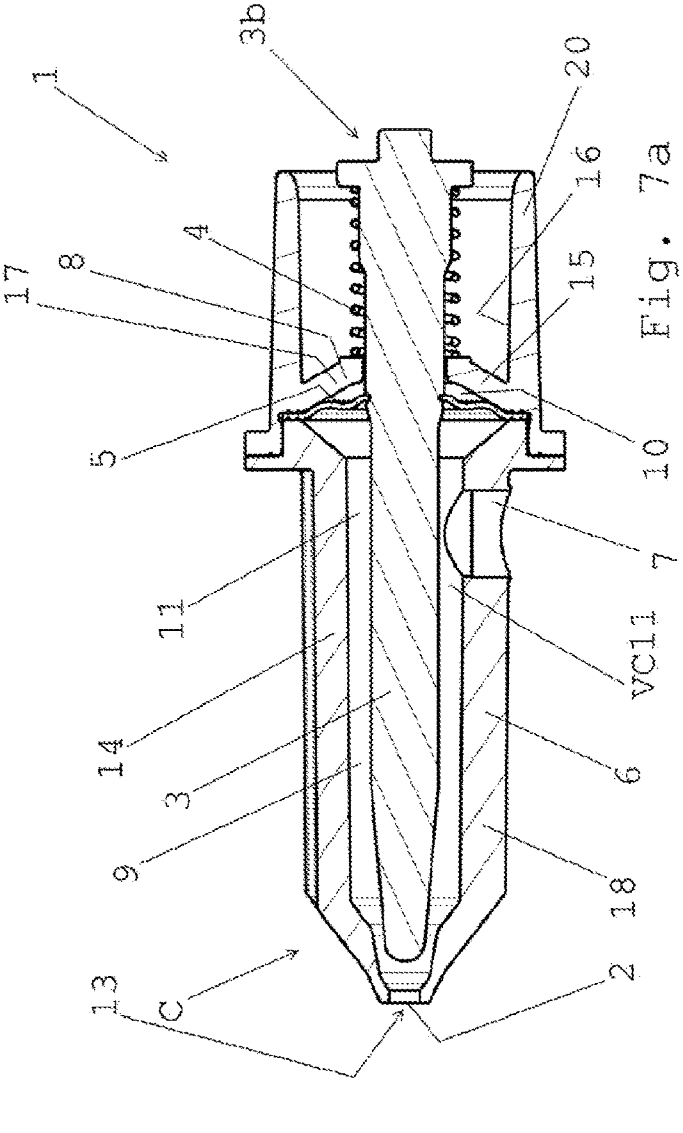

In the position illustrated in FIG. 2, a nozzle opening 2 of the paint nozzle module 1 is closed by a needle 3 of the paint nozzle module 1, because the trigger 304 is not actuated and the bracing spring 307 pushes the plunger 305 with such a pressure force against a rear end 3*b* (see FIG. 3) of the needle 3 that said pressure force, overcoming a pressure force of a pressure spring 4 seated on the needle 3, pushes the needle 3 from an open position C, shown in FIG. 7*a*, into a closed position A, shown in FIG. 2 and in FIG. 5*a*. This occurs because the spring force of the bracing spring 307 is greater than the pressure force of the pressure spring 4.

If a user actuates the trigger 304 in an arrow direction x, the bracing spring 307 is compressed, such that the pressure spring 4, supported on the needle guide 8 and abutting against a collar 3*c* of the needle 3, can push the needle 3 in the arrow direction x against the plunger 305, and the needle 3 leaves the closed position A shown in FIG. 5*a* in the direction of the open position C (see FIG. 7*a*), wherein, here, the plunger 305 is pushed by the needle 3 in the arrow direction x.

Figure 4:
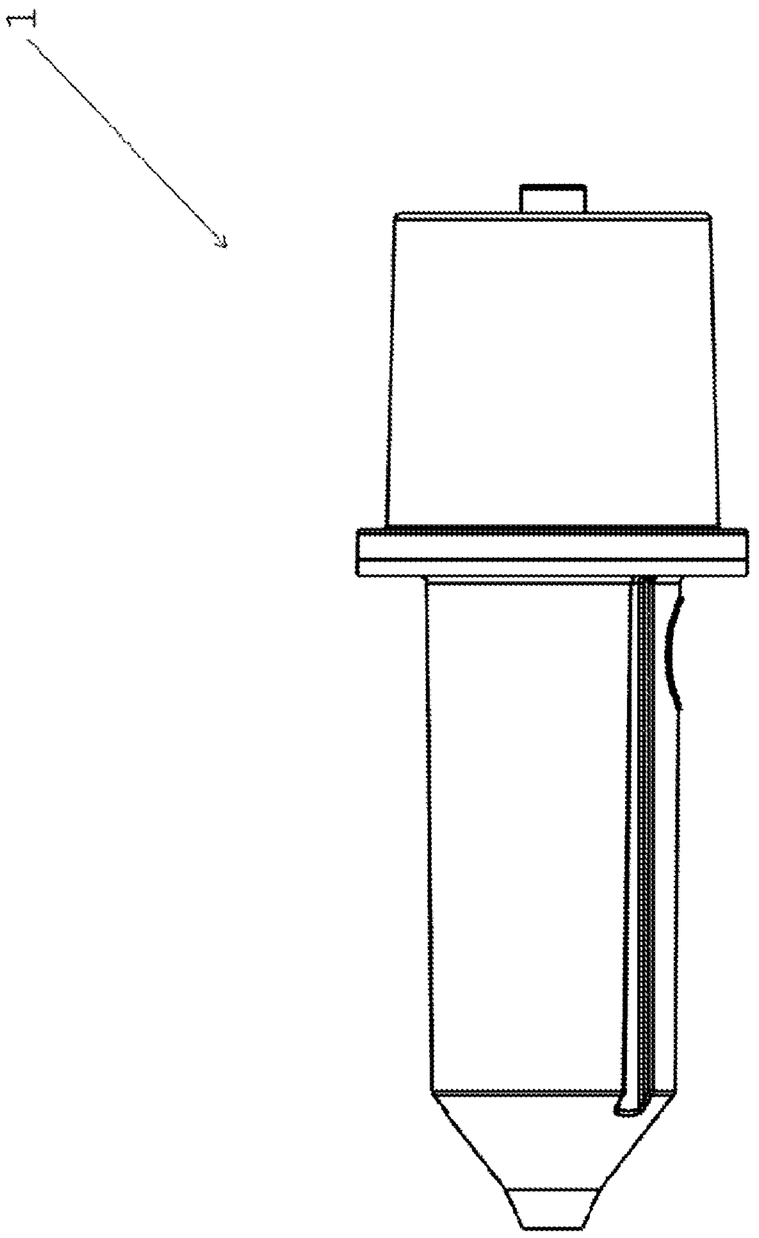
FIG. 4 shows a side view of the paint nozzle module known from FIGS. 2 and 3.
Figure 6B:
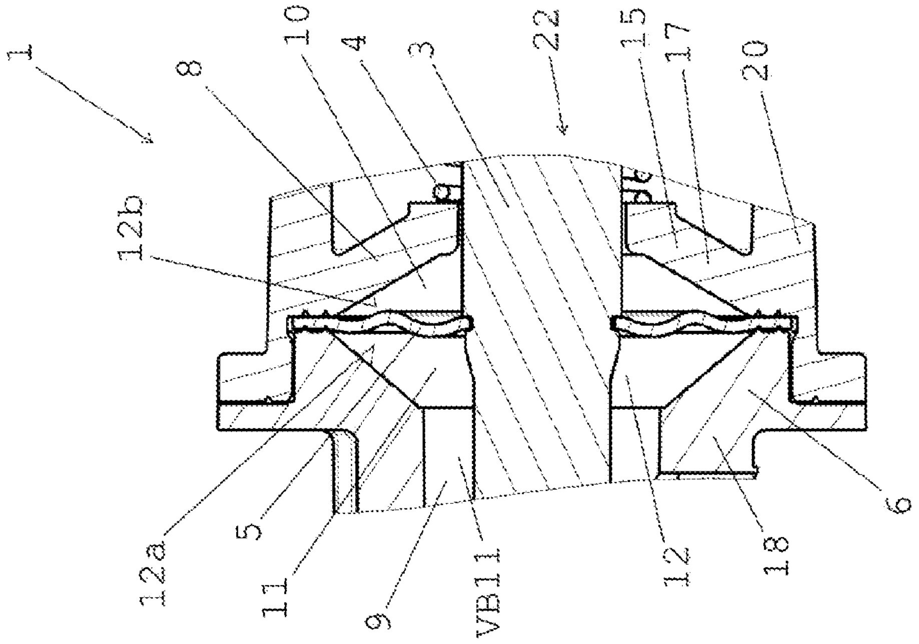
FIGS. 6*a* and 6*b* show a sectional side view of the paint nozzle module shown in FIG. 4, with the nozzle opening open, and a detail view in the region of the seal.
Figure 6A:
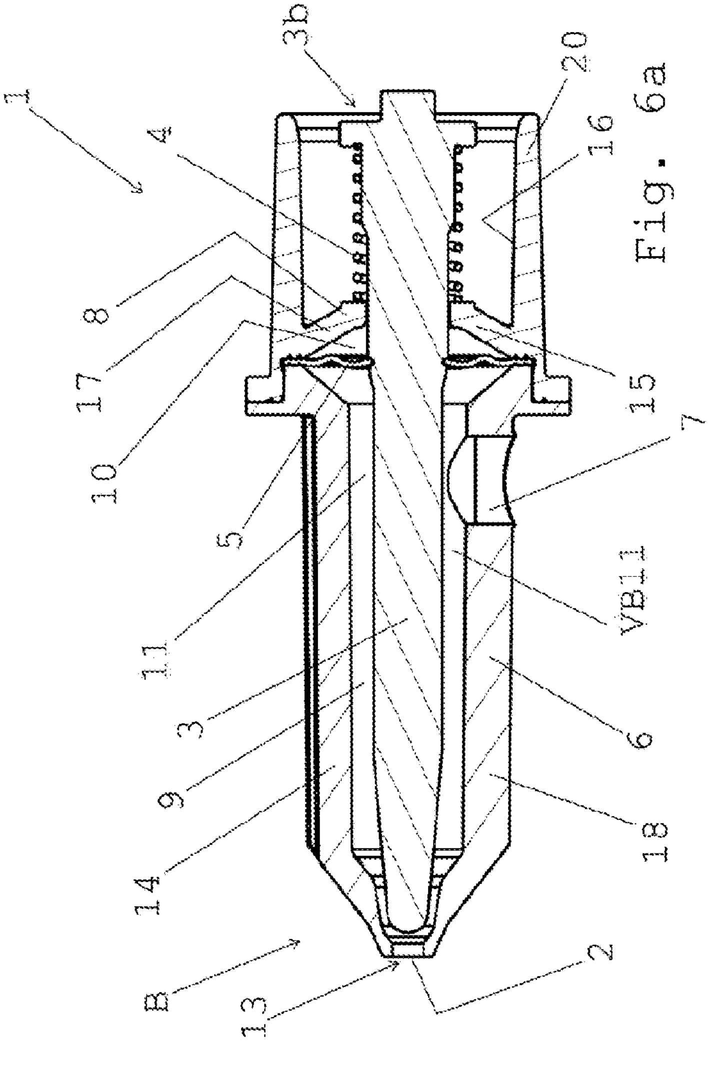

FIG. 4 shows the paint nozzle module 1 in a side view, and FIGS. 5*a*, 6*a* and 7*a* show the paint nozzle module 1 in each case in a sectional side view, with the needle 3, a seal 5 and the pressure spring 4 in different positions, specifically the closed position A (see FIG. 5*a*), the open position C (see FIG. 7*a*), or an intermediate position B (see FIG. 6*a*). FIGS. 5*b*, 6*b* and 7*b* each show a detail view, corresponding to FIGS. 5*a*, 6*a* and 7*a* respectively, of the paint nozzle module 1 in the region of the seal 5.

It can be seen from FIG. 5*a* that the needle 3 is surrounded by a nozzle element 6. The nozzle element 6 comprises a nozzle opening 2, a paint infeed 7 and a needle guide 8. The seals divides an interior space 9, which is enclosed by the nozzle element 6, into a prechamber 10 and a paint chamber 11. The seals is configured as a diaphragm seal and is connected to the needle 3 at a fixed position. Furthermore, the seals configured as a diaphragm seal is connected to the nozzle element 6 at a fixed position. The interior space 9 comprises a widened portion 12 toward the needle guide 8. The needle 3 and the nozzle opening 2 form a paint nozzle 13.

Here, when the paint nozzle 13 is closed, or when the needle 3 is in the closed position A, the seals is deformed by the needle 3 in the direction of the nozzle opening 2 in such a way that said seal partially bears against a front inner lateral surface 12*a* of the widened portion 12, such that a volume VA11 of the paint chamber 11 is minimized both in relation to a volume VB11, which the paint chamber 11 assumes in the intermediate position B, and in relation to a volume VC11, which the paint chamber 11 assumes in the open position C. Here, when the needle 3 is in the closed position A, the seals bears with a front annular surface KF5*a* against the front inner lateral surface 12*a* (see FIGS. 5*a* and 5*b*). Here, when the needle 3 is in the open position C, the seals bears with a rear annular surface KF5*b* against a rear inner lateral surface 12*b* of the widened portion (see FIGS. 7*a* and 7*b*).

When the needle 3 is in the intermediate position B, the seals is situated with the front annular surface KF5*a* and the rear annular surface KF5*b* between the front inner lateral surface 12*a* and the rear inner lateral surface 12*b* of the widened portion 12 of the interior space 9, without making contact therewith (see FIGS. 6*a* and 6*b*).

In this way, when the needle 3 is in the open position C, that is to say when the paint nozzle 13 is fully open, the seals can be supported on the rear inner lateral surface 12*b* such that only a low load is exerted on said seal by the pressure of the paint that flows through the paint chamber 11.

The nozzle element 6 comprises a hollow cylindrical shell 14, wherein the needle guide 8 is formed by a plate-like perforated disk 15 that is molded onto an inner lateral surface 16 of the hollow cylindrical shell 14, and wherein a wall 17 of the plate-like perforated disk 15 is inclined in the direction of the pressure spring 4 proceeding from the shell 14. As a result, the perforated disk 15 that forms the needle guide 8 is situated obliquely such that a pressure force originating from the pressure spring 4 can be transmitted to the shell 14 in an effective manner.

In the illustrations of FIGS. 5*a* to 7*b*, it is to be assumed that these show the paint nozzle module 1 in the installed state, and it is therefore always to be assumed that the spring-loaded plunger (see FIG. 2) is pressing against the free end 3*b* of the needle 3 in a manner dependent on the position of the trigger, such that the pressure spring 4 is compressed to different degrees, as shown in FIGS. 5*a*, 6*a* and 7*a*. Here, the pressure spring 4 is compressed to the greatest degree in the closed position A (FIG. 5*a*), and the pressure spring 4 is compressed to the smallest degree in the open position C (FIG. 7*a*).

It can also be seen from FIGS. 5*a* to 7*b* that the nozzle element 6 is formed in two parts and comprises a front nozzle element portion 18, with the nozzle opening 2 and the paint infeed 7, and a rear nozzle element portion 20, with the needle guide 8. Here, the front nozzle element portion 18 comprises a rear flange 19, which comprises two steps 19*a*, 19*b*. Here, the rear nozzle element portion 20 comprises a front flange 21, which comprises two steps 21*a*, 21*b*. Here, end faces 19*c*, 21*c* of the in each case outer step 19*a*, 21*a* bear against one another and are ultrasonically welded. Here, end faces 19*d*, 21*d* of the in each case inner step 19*b*, 21*b* face one another, clamping the seals between them (see FIG. 5*b*).

The seal 5 is connected in positively locking fashion to the needle 3, wherein, to receive the perforated-disk-like seal 5, the needle 3 comprises a radially encircling groove 5*a* (see FIG. 5*b*) into which the seal 5 is snap-fitted after being elastically expanded. The needle 3 and the seal 5 together form a two-part displacement insert 22 which is movable in the nozzle element 6 and relative to the nozzle element 6 along a longitudinal axis L1 (see FIG. 5*a*) of the paint nozzle module 1.

The rear inner lateral surface 12*b* is formed by the needle guide 8. The front inner lateral surface 12*a* is formed in the region of the rear flange 19 of the front nozzle element portion 18.

For example, it can be seen from FIG. 7*b* that the seal 5, which is configured as a diaphragm seal, is configured as a perforated-disk-like seal which has a hole 51 in which the needle 3 is received. A thickness D5 of the seal 5 is small enough that the seal 5 is elastically deformable or elastically bendable such that an inner edge 52 of the seal 5, which inner edge surrounds the hole 51, and an outer edge 53, which runs around the seal 5, lie in mutually parallel and mutually spaced-apart planes E52 and E53 when the needle 3 is in the closed position A or the open position C or in a position between the intermediate position B and the closed position A or between the intermediate position B and the open position C.

Figure 8:
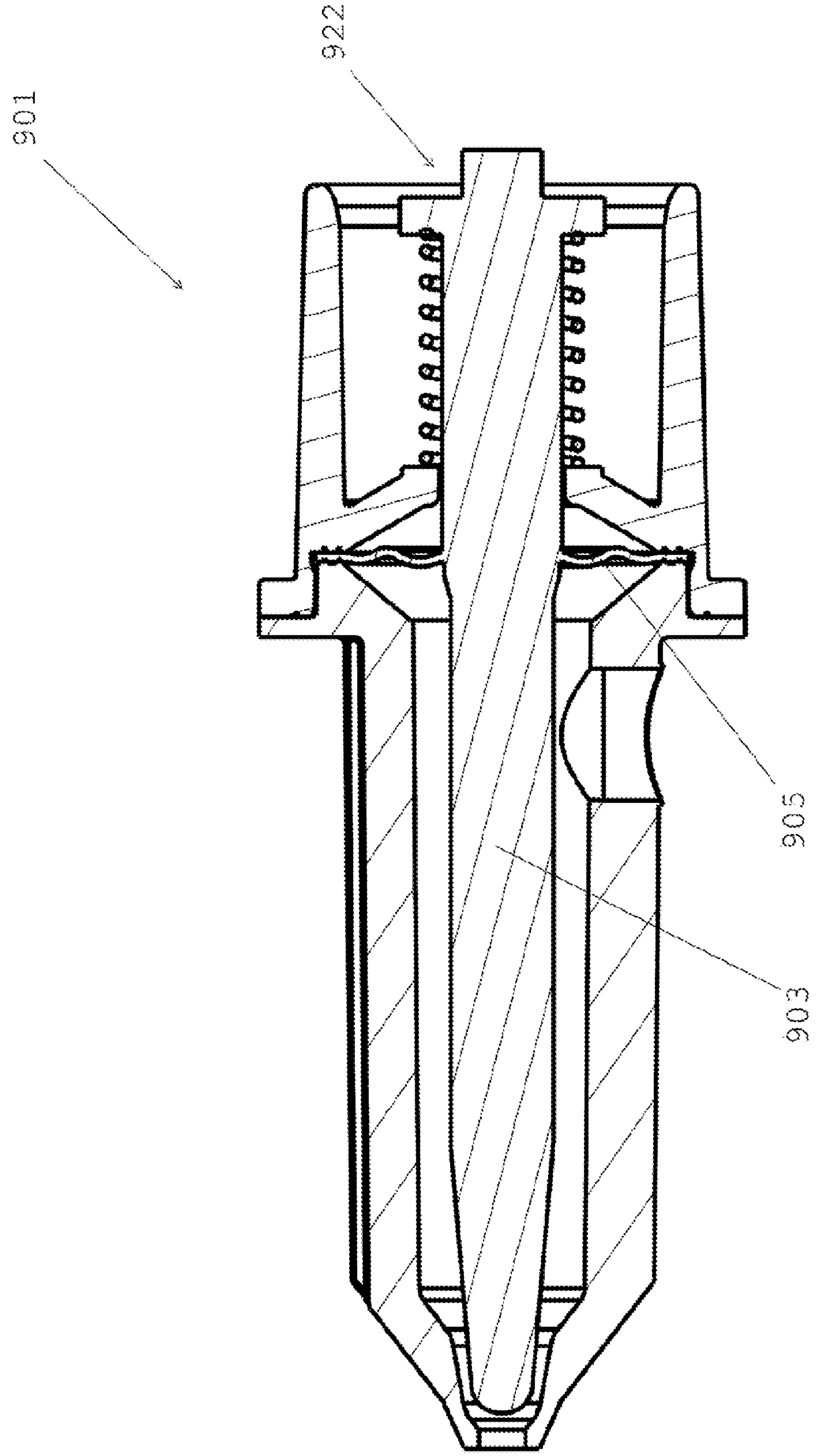
FIG. 8 shows a sectional side view of a design variant of a paint nozzle module according to one example, which is shown, analogously to FIG. 7*a*, with the nozzle opening open.

FIG. 8 shows a paint nozzle module 901 in a sectional side view. This paint nozzle module 901 constitutes a design variant in relation to the paint nozzle module shown in the preceding figures, and differs from the variant shown in the preceding figures only by a differing design of a displacement insert 922. In this respect, with regard to the other components of the paint nozzle module 901 and with regard to their basic function, reference is made to the description relating to the paint nozzle module shown in the preceding figures.

The displacement insert 922 comprises a needle 903 and a seal 905, which are formed as an integral component that forms the displacement insert 922. Here, the seal 905 is formed from a plastic and is molded onto the needle 903.

In a further design variant that is not illustrated, provision may also be made whereby a displacement insert is configured such that the seal is connected in non-positively locking fashion to the needle, wherein, for this purpose, the needle is adhesively bonded or welded to the perforated-disk-like seal.

In all design variants, a rolling deformation of the seal configured as a diaphragm seal occurs as the needle is moved. In this way, the paint nozzle module is not subject to any wear, such as occurs when using a sliding seal.

In a design variant that is not illustrated, provision is also made whereby the paint nozzle module is cohesively connected to a further component of the paint-spraying device and in particular to the front end.

The paint-spraying device 301 shown in particular in FIGS. 1 and 2 for generating a paint spray jet comprises the front end 201 and the back end 301, wherein the front end 201 and the back end 301 are connected to one another such that they can be separated by virtue of the back end 301 and the front end 201 being pulled apart, as can be seen from FIG. 3. It can also be seen from FIGS. 1 to 3 that the paint-spraying device 101 comprises a paint container 401, wherein the paint container 401 comprises an air feed line 402 that leads into the paint container 401. This air feed line 402 comprises a check valve 403. The check valve 403 is configured such that an air flow generated by the electric blower 302 (see FIG. 3) can also flow into an interior space 404 of the paint container 401, but a return flow is prevented. For this purpose, the check valve 403 is configured as a disk valve. The paint-spraying device 101 furthermore comprises an air discharge line 405 that is connected to the paint container 401, wherein the air discharge line 405 comprises a shut-off valve 406 that is configured as a slide valve 407. The air discharge line 405 is closed by means of the shut-off valve 406 during the operation of the paint-spraying device 101, specifically when the latter has been fully assembled, as shown in FIGS. 1 and 2 and in FIG. 13.

In particular, it can also be seen from FIGS. 2 and 3 that the front end 201 comprises a main element 201*a*, onto which the air cap 202 and the sleeve nut 203 are mounted and into which the paint container 401 is screwed. It can also be seen that the back end 301 also comprises a main element 301*a*, which receives the electric blower 302 and on which the trigger 304 is guided.

Figure 9:
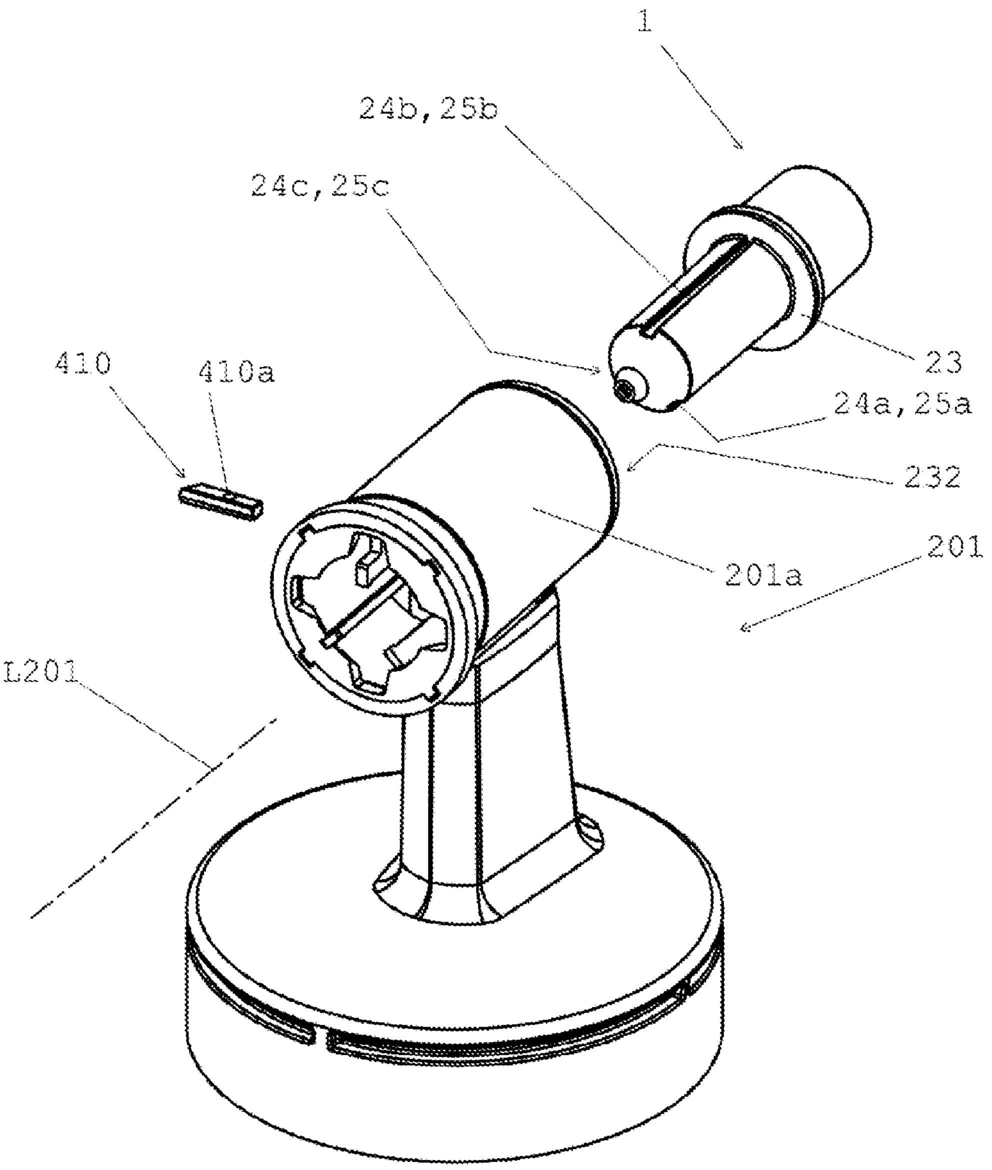
FIGS. 9-12 show perspective views of the front end and paint nozzle module from different perspectives and in each case in different positions relative to one another.
Figure 10:
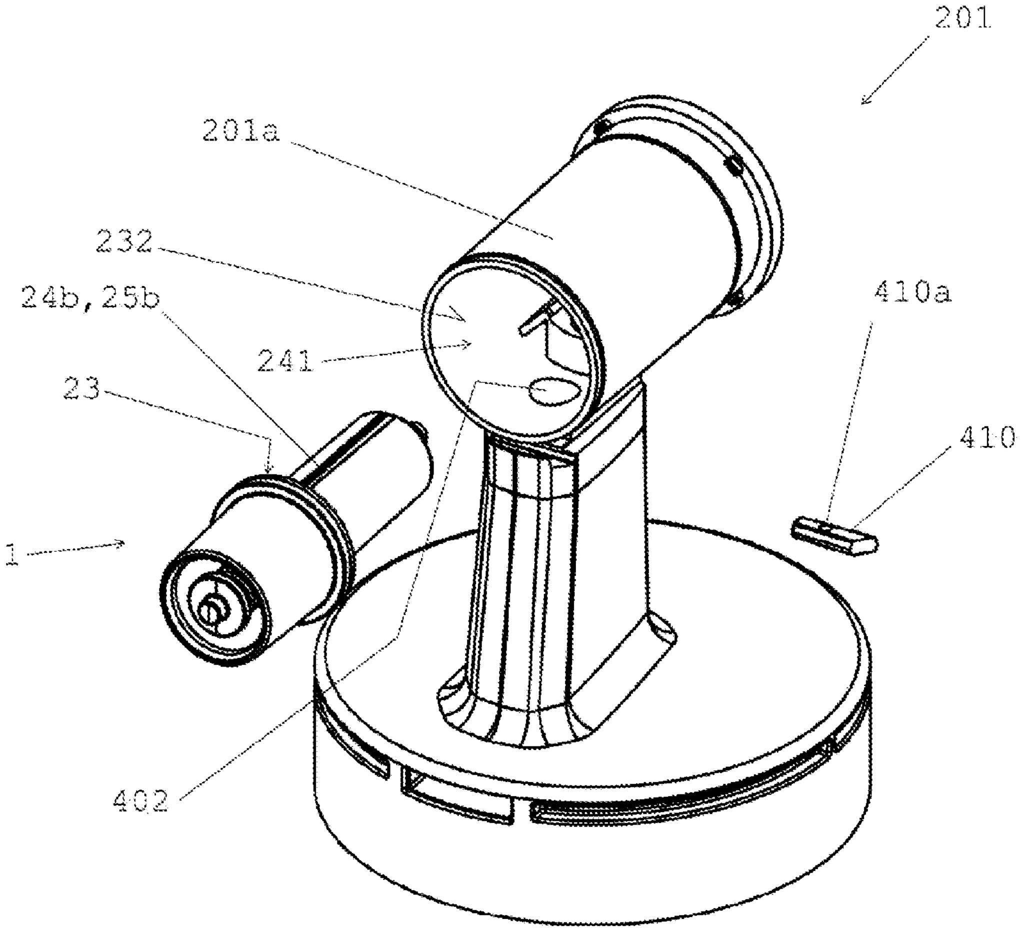
Figure 11:
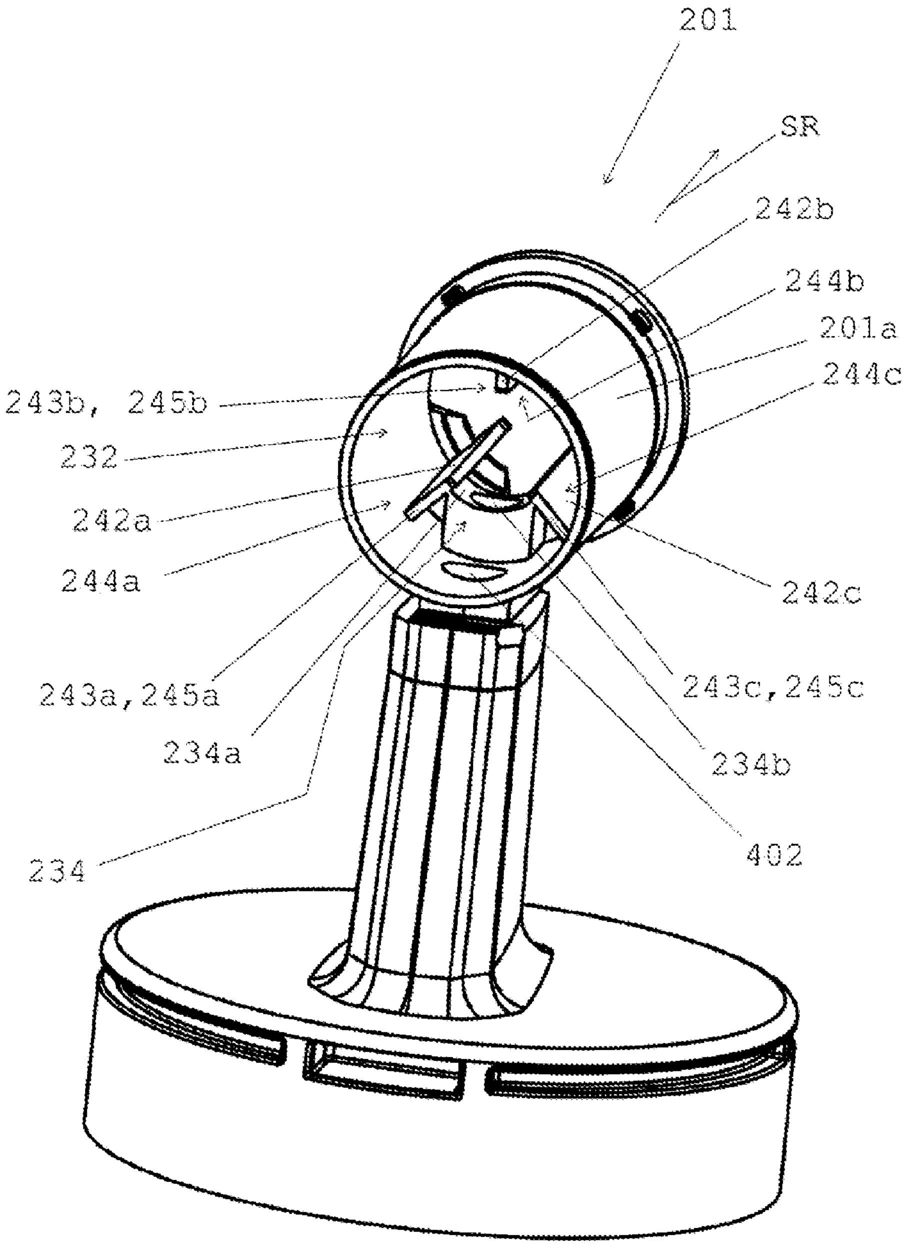

Viewing FIGS. 13 to 19 together, which figures show sectional detail views of the paint-spraying device 101, it is apparent that the shut-off valve 406 comprises a valve housing 408 and a closure 409, wherein the shut-off valve 406 furthermore comprises a seal 410. This seal is of strip-like form and has a through bore 410*a* approximately in the center. The exploded illustrations of FIGS. 9 and 10 each show said seal 410 with its through bore 410*a* in a perspective view, without illustrating the other components of the shut-off valve. FIGS. 13 to 19 show the seal 410 in section, with the section passing through the through bore.

Figure 13:
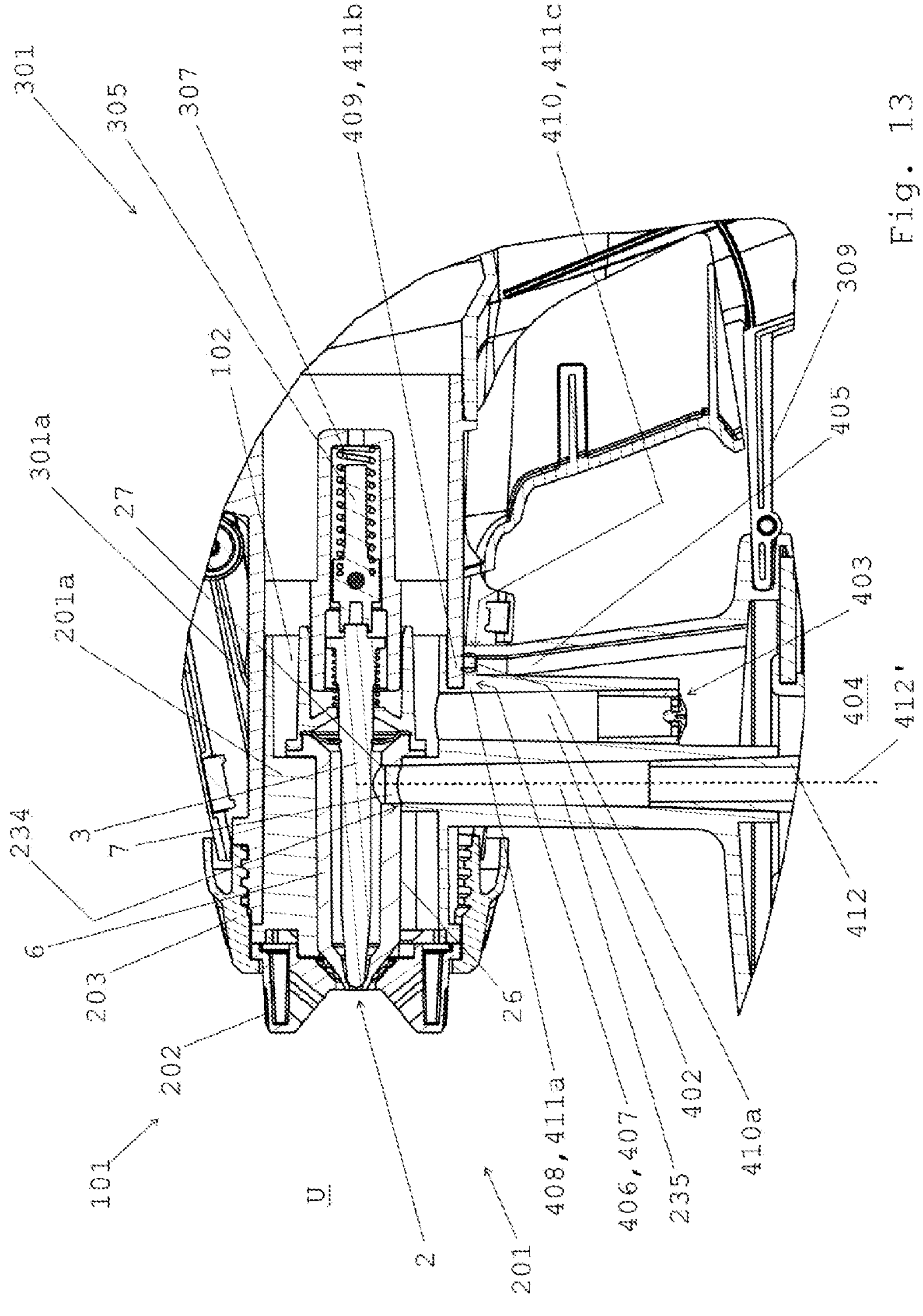
FIG. 13 shows a detail from a sectional illustration of the paint-spraying device, with the sleeve nut having been tightened.
Figure 14:
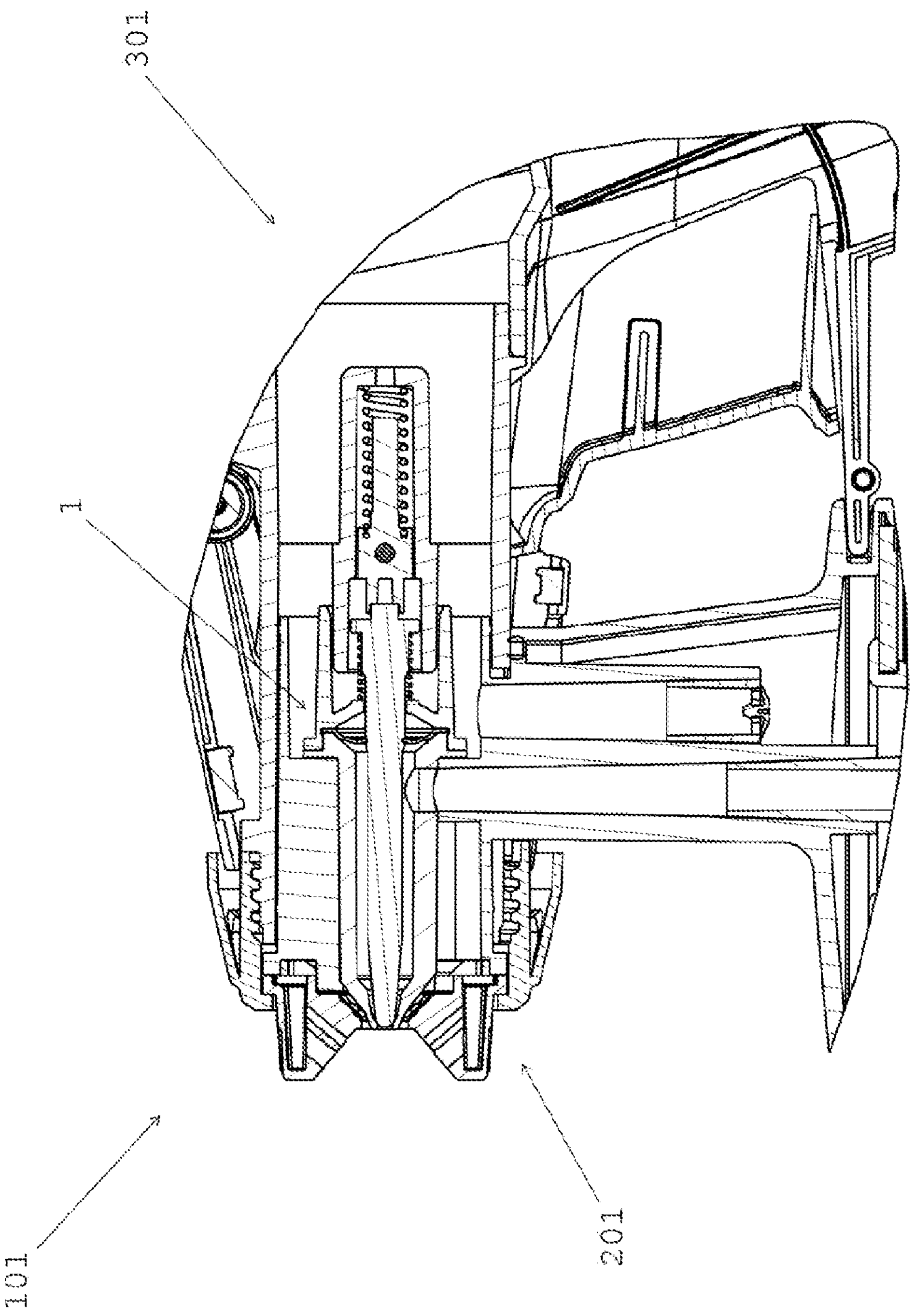
FIGS. 14-18 show, analogously to the illustration in FIG. 13, further sectional illustrations of the paint-spraying device, with the sleeve nut being progressively loosened from figure to figure.
Figure 15:
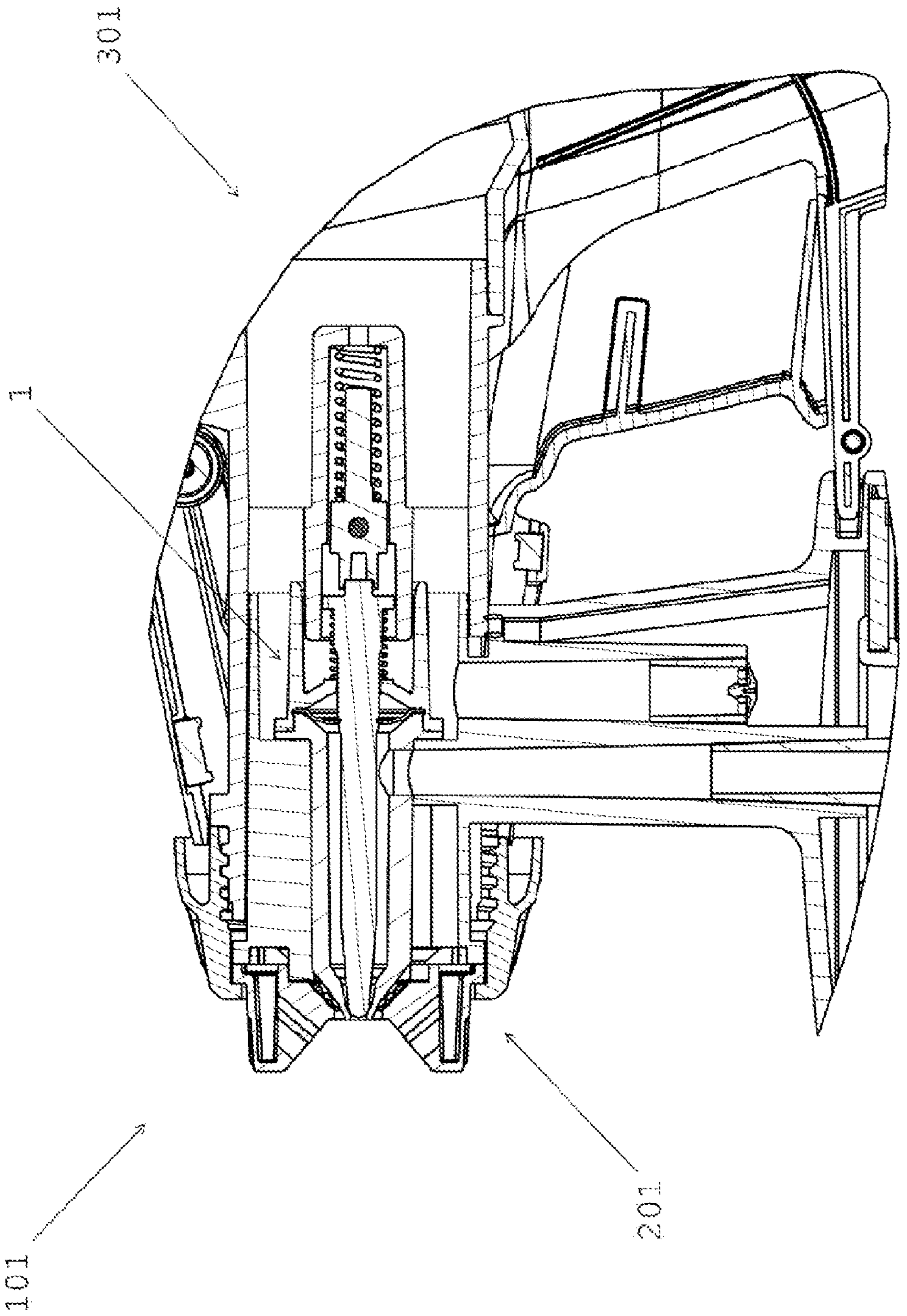
Figure 16:
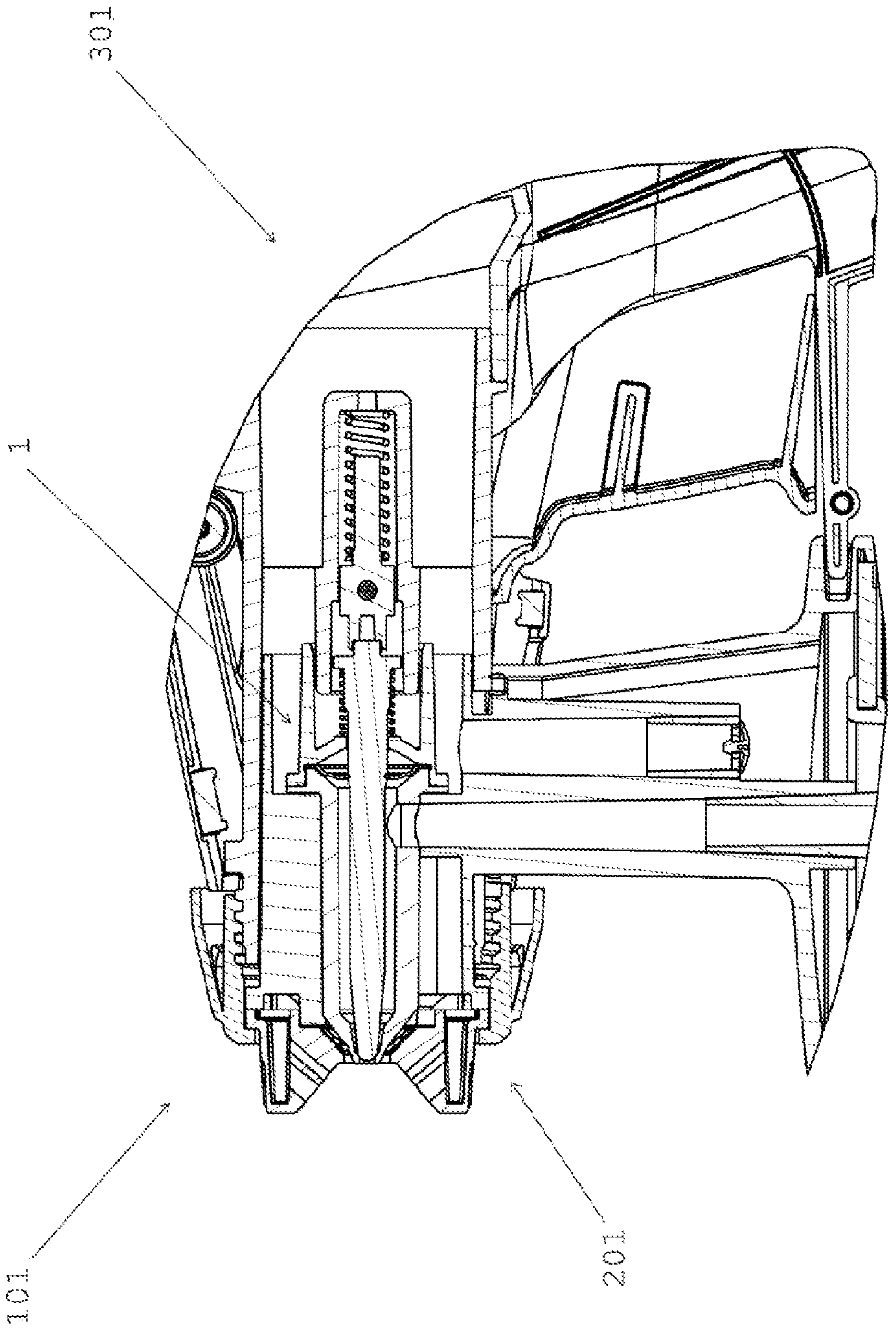
Figure 17:
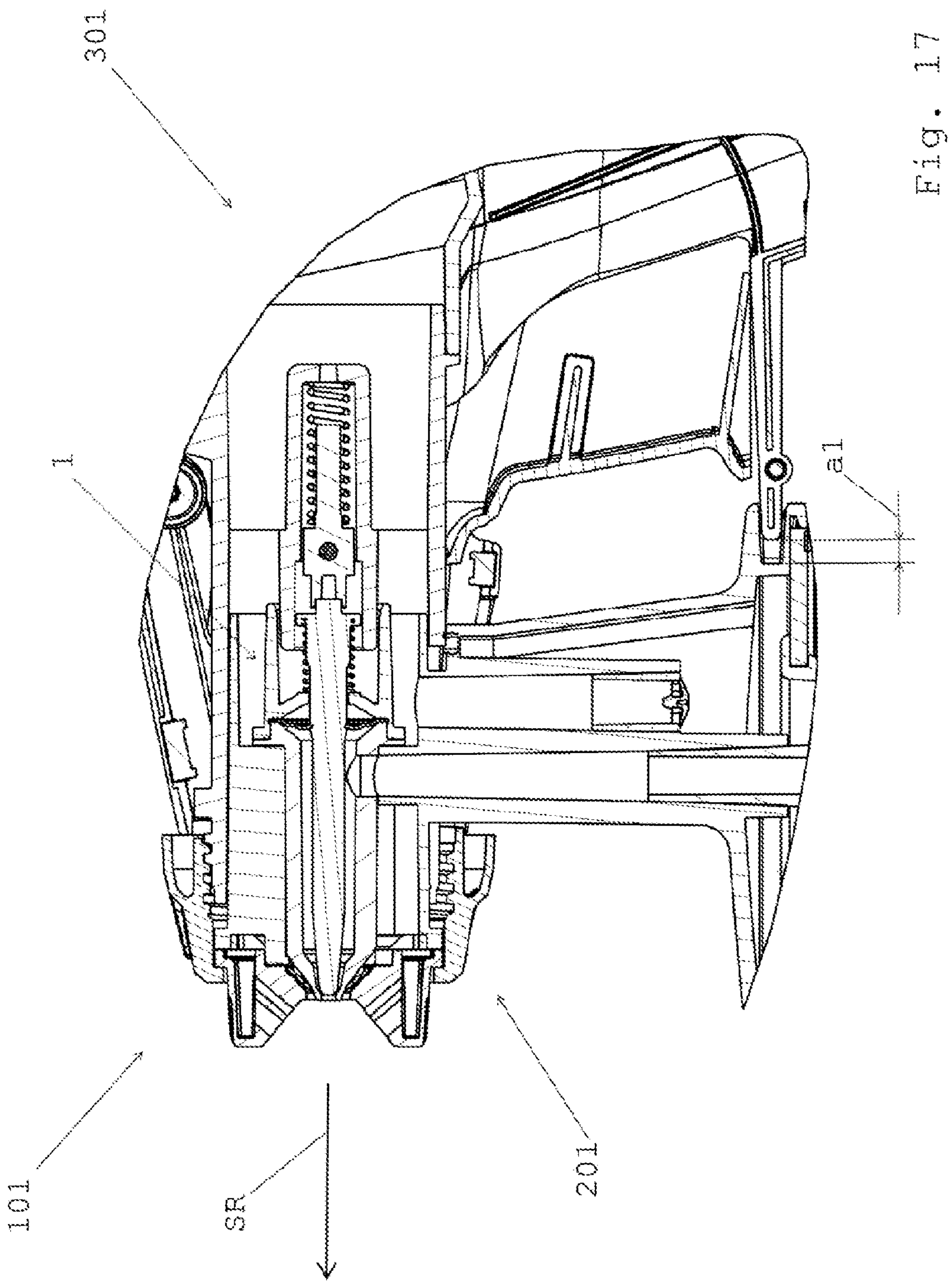
Figure 18:
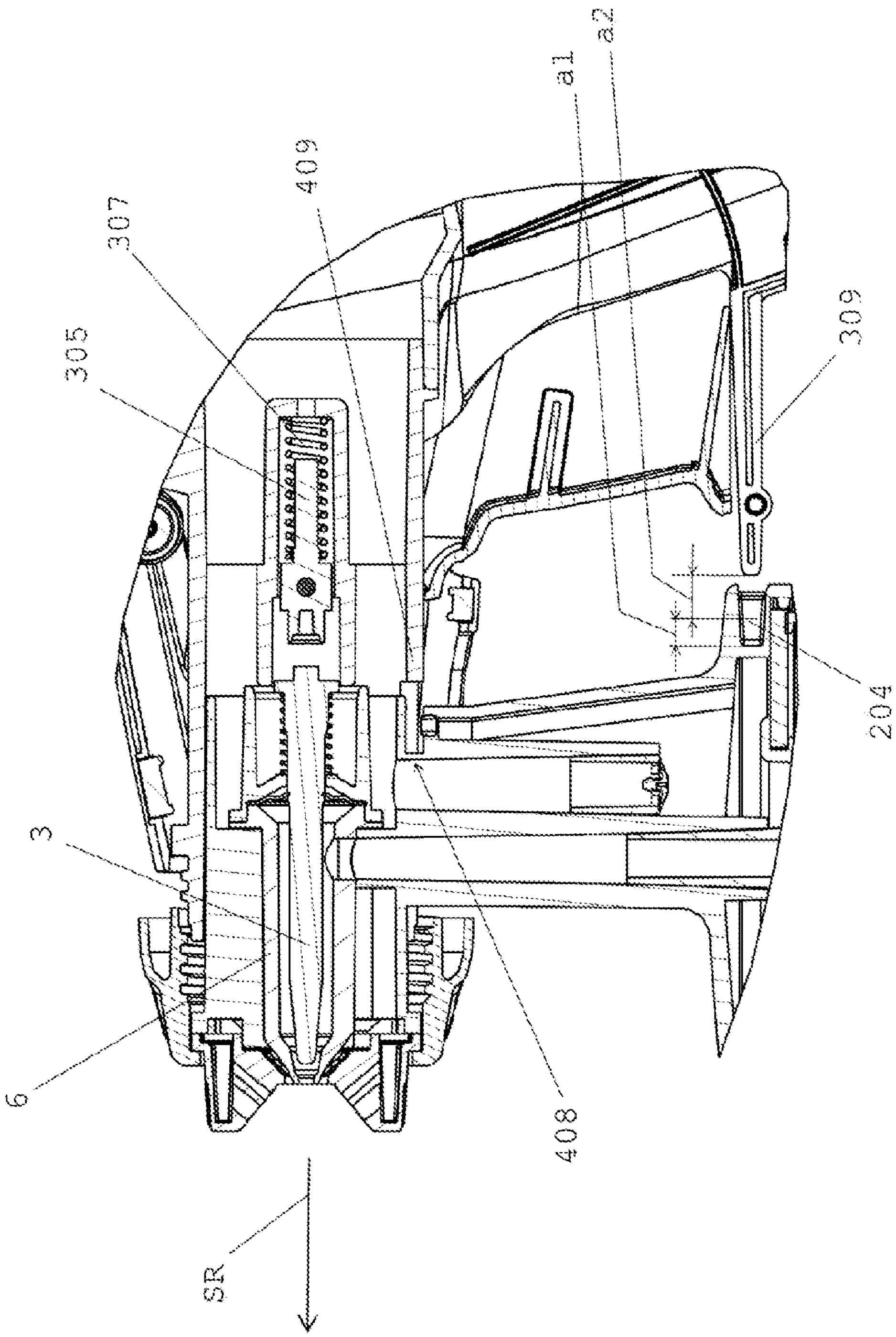
Figure 19:
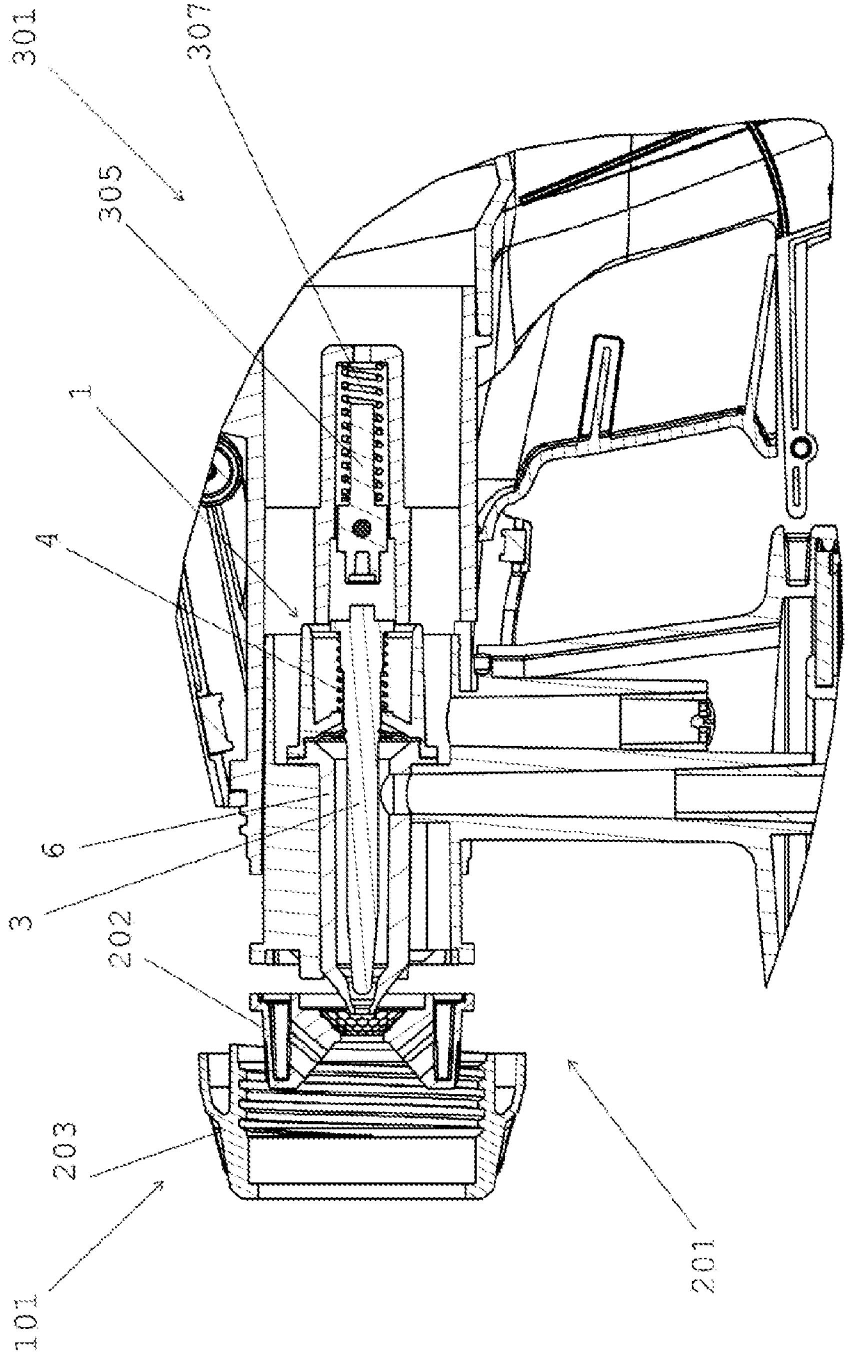
FIG. 19 shows, analogously to the illustrations in FIGS. 13 to 18, a further sectional illustration of the paint-spraying device, with the sleeve nut having been completely removed.

FIGS. 13 to 19 are to be understood in the sense that FIG. 13 shows the paint-spraying device 101 when the sleeve nut 203 has been tightened, FIGS. 14-18 show the paint-spraying device in further illustrations analogous to the illustration of FIG. 13, with the sleeve nut being progressively loosened from figure to figure and the front end 201 and the back end 301 moving progressively further apart as a result. FIG. 19 then shows the paint-spraying device 101 when the sleeve nut 203 has been completely removed, such that a main element 201*a* of the front end 201 and a main element 301*a* of the back end 301 can be pulled apart entirely. This progressive separation of front end 201 and back end 301 can be seen most easily from the fact that a connecting web 309, which runs horizontally below the trigger 304, of the back end 301 moves progressively out of a receptacle 204 of the front end 201, into which receptacle said connecting web protrudes in the assembled state in order to stabilize the connection of the front end 201 and back end 312. In FIG. 18, the connecting web 309 has then been completely separated from the receptacle 204.

The valve housing 408 of the shut-off valve 406 is formed by the front end 201, and the closure 409 of the shut-off valve 406 is formed by the back end 301, wherein the main element 201*a* of the front end 201 forms the valve housing 408, and wherein the main element 301*a* of the back end 301 forms the closure 409. Here, said seal 410 is received and held by the valve housing 408 and is thus also a constituent part of the front end 201.

It is apparent from the illustrations of FIGS. 13 to 16 that the through bore 410*a* of the seal 410 is closed by the closure 409 that is formed by a projection of the main element 301*a* of the back end 301, despite the front end 201 and the back end 301 moving progressively further apart as the sleeve nut 203 is unscrewed.

It is then apparent from the illustration of FIG. 17 that, in the unscrewed position of the sleeve nut 203 illustrated therein, the through bore 410*a* is only approximately half-covered by the closure 409.

It is then apparent from the illustration of FIG. 18 that, in the further unscrewed position of the sleeve nut 203 illustrated therein, the through bore 410*a* has now been fully opened up, because the closure 409 has been pulled all the way out of the valve housing 408.

Thus, proceeding from an unscrewed position of the sleeve nut 203 shown in FIG. 16, air can escape from the interior space 404 of the paint container 401 into the surroundings U via the air discharge line 405, because, in the unscrewed position of the sleeve nut 203 shown in FIG. 16, the front end 201 and the back end 301 have already been separated from one another to such an extent that they no longer bear sealingly against one another.

Correspondingly, the shut-off valve 406 is closed when the back end 301 has been fully inserted into the front end 201, and the shut-off valve 406 is open when the back end 301 has been pulled all the way out of the front end 201.

It is furthermore apparent from FIGS. 1 to 5*b* and 13 to 19 that the front end 201 receives the paint nozzle module 1, which comprises the nozzle element 6, the needle 3, the seal 5 and the pressure spring 4, and that the back end 301 receives the plunger 305, the bracing spring 307 and the trigger 304. Here, the bracing spring 307 is configured to be stronger than the pressure spring 4, and the needle 3 is forced by means of the plunger 305 into a closed position, in which the needle 3 closes the nozzle opening 2 of the nozzle element 6, when the back end 301 and the front end 201 have been pushed fully together, as is apparent in particular from FIGS. 2 and 13. Here, the needle 3 is forced by the pressure spring 4 into an open position, in which the nozzle opening 2 of the nozzle element 6 is opened up by the needle 3, when the back end 301 been pulled out of the front end 201, as is apparent in particular from FIGS. 3 and 18, 19. For this purpose, a spring travel of the bracing spring 307 and the plunger 305 are dimensioned such that, as the back end 301 and the front end 201 are pulled apart, the needle 3 remains in the closed position until the shut-off valve 406 is at least partially open, as can be seen from a comparison of FIGS. 16 and 17. Correspondingly, the needle 3 opens up the nozzle opening 2 only when the shut-off valve 406 is already at least partially open, such that the pressure that prevails in the interior space 404 of the paint container 401 after operation of the paint-spraying device 1 can dissipate before the needle 3 opens up the nozzle opening 2 during the dismantling of the paint-spraying device 101. It is thus ensured that an unexpected and undesired escape of paint from the nozzle opening 2 of the paint nozzle module 1 is reliably prevented.

The method for ventilating the paint container 401 of the paint-spraying device 101 for generating a paint spray jet comprises the steps:

pulling the back end 301 and the front end 201 apart by a first distance a1 along a spraying direction SR such that the shut-off valve 406, which is formed by the front end 201 as a valve housing 408 and by the back end 301 as a closure 409, is at least partially opened, pulling the back end 301 and the front end 201 apart further by a further distance a2 along the spraying direction SR such that a needle 3, which is received in the front end 201 and which closes the nozzle opening 2 of the nozzle element 6, is released from the back end 301.

It is apparent in particular from FIG. 3 that the main element 301*a* of the back end 301 comprises an outer flange 331 and a receiving flange 332 and that the main element 201*a* of the front end 201 comprises an outer flange 231 and an inner flange 232. Here, the paint nozzle module 1 is received by the inner flange 232. Here, the outer flange 231 is received by the receiving flange 332 such that the front end 201 together with the paint nozzle module 1 is guided displaceably, in a manner secured against rotation, in the receiving flange 332 counter to a pressure force exerted on the needle 3 of the paint nozzle module 1 by the plunger 305, and is fixed in a manner dependent on a rotational position of the sleeve nut 203 that is screwed onto a thread 308 that forms the outer flange 331.

Viewing FIGS. 3 and 13 to 19 together, it is furthermore apparent that the sleeve nut 203 bears against the main element 201*a* of the front end 201 via the air cap 202, and a bracing force introduced by the sleeve nut 203 is transmitted via the inner flange 232 of the main element 201*a* to the paint nozzle module 1 and the needle 3 thereof such that said bracing force acts as an opposing force in relation to the pressure force of the plunger 305, which is built up in the direction of the front end 201 by the bracing spring 307 that is connected to said plunger.

Viewing FIGS. 3 and 9 to 12 together, it is also apparent that the paint nozzle module 1 is received in a receiving space 241, which is surrounded by the inner flange 232 of the main element 201*a* of the front end 201, such that the paint nozzle module 1 is aligned with a longitudinal axis L201 of the front end 201 by three centering means 242*a*-242*c* of the main element 201*a* of the front end 201. Here, the paint nozzle module 1 bears with a collar 23 against stop means 243*a*-243*c* of the main element 201*a* of the front end 201 in the spraying direction SR. Furthermore, the paint nozzle module 1 is secured against rotation on the centering means 242*a*-242*c* by three guide means 24*a*-24*c*.

The centering means 242*a*-242*c* are formed by three webs 244*a*-244*c* which are aligned with the longitudinal axis L201 of the front end 201 and which project into the receiving space 241. The stop means 243*a*-243*c* of the front end 201 are formed by rear surfaces 245*a*-245*c* of the webs 244*a*-244*c*, and the guide means 24*a*-24*c* of the paint nozzle module 1 are formed by three grooves 25*a*-25*c*, with a web being received in each groove.

The main element 201*a* of the front end 201 comprises a container flange 233, wherein the paint container 401 is screwed into said container flange (see FIG. 3).

Furthermore, the main element 201*a* of the front end 201 comprises a liquid flange 234, wherein the liquid flange 234 comprises a sealing surface 234*a* and a paint feed opening 234*b* that is surrounded by the sealing surface 234*a*. Here, the sealing surface 234*a* is arranged in the region of the inner flange 232 such that the sealing surface 234*a* of the liquid flange 234 bears against a lateral surface 26 of the nozzle element 6 of the paint nozzle module 1 and the paint feed opening 234*b* is situated opposite a shell opening 27 of the nozzle element 6 of the paint nozzle module 1 (see FIGS. 3, 10, 11 and 13). Paint can thus be conducted directly through the main element 201*a* to the paint nozzle module 1. A supply is provided to a paint channel 235, which leads to the liquid flange 234, of the main element 201*a* via a riser pipe 412 of the paint container 401, which riser pipe is inserted sealingly into the paint channel 235. This insertion takes place as the paint container 401 is screwed into the container flange 233 of the front end 201.

In a design variant that is indicated in FIG. 13, provision is alternatively also made whereby, instead of the riser pipe 412, the paint container 401 comprises a riser pipe 412' that is schematically indicated by a dotted line, wherein said riser pipe 412' is of such a length that, as the paint container 401 is screwed in, said riser pipe is guided to or into the paint infeed 7 of the paint nozzle module 1 such that paint is supplied directly to the paint nozzle module via the riser pipe 412'.

Viewing FIGS. 3 and 13 to 19 together, it is apparent that the back end 301 comprises a first valve component 411*a*—configured as a valve housing 408—and that the front end comprises a second valve component 411*b*—configured as a closure 409. These together form the shut-off valve 406. Here, a position that the components 411*a*, 411*b* assume relative to one another is determined by the rotational position of the sleeve nut 203 on the thread 308, and a degree of opening of the shut-off valve 406 is thus determined by the rotational position of the sleeve nut 203. As a third valve component 411*c*, the shut-off valve 406 comprises the seal 410.

Figure 12:
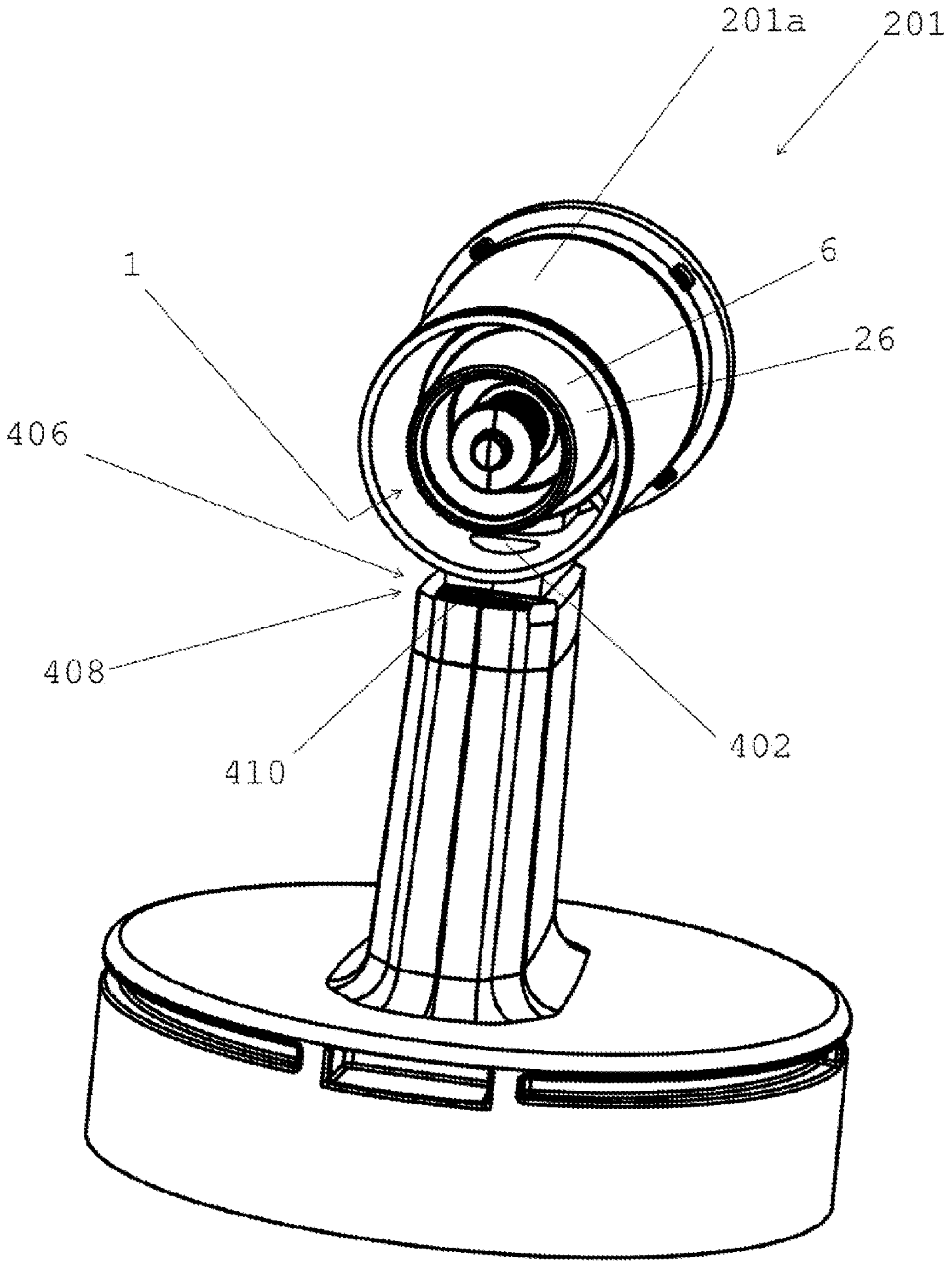

When the sleeve nut 203 has been sufficiently loosened, the shut-off valve 406 is open, and pressure can escape from the paint container into the surroundings (see FIG. 17). When the sleeve nut 203 has been tightened, the shut-off valve 406 is closed, and pressure can be built up in the interior space 404 of the paint container 401, by means of which pressure paint is forced via a riser pipe 412 into a paint channel 235 which is formed in the main element 201*a* of the front end 201 and which leads to the paint feed opening 234*b* (see FIG. 13). The paint channel 235, the air feed line 402 and the air discharge line 405 run parallel to one another, and all three are formed in the main element 201*a* (see FIG. 13). A feed opening 402*a* that leads from a compressed-air chamber 102 of the paint-spraying device 101 into the air feed line 402 can also be seen in FIGS. 10, 11 and 12. FIG. 12 shows the valve housing 408 with the seal 410 having been inserted. The valve housing 408 is formed by the main element 201*a* of the front end 201. The closure 409 (not illustrated in FIG. 11) of the shut-off valve 406 lies in the manner of a slide on the seal 410 in the closed state.

As the sleeve nut 203 is loosened, the shut-off valve 406 opens before further loosening of the sleeve nut 203 also brings about a movement of the needle 3 that causes a nozzle opening 2 of the paint nozzle module 1 to be opened. The movement of the needle 2 first begins at a later point in time, because the needle 3 can firstly deflect when a preload of the bracing spring 307 has been depleted to such an extent that the pressure spring 4 is strong enough to pull the needle 2, against the plunger 305, out of the nozzle opening 2 (compare FIGS. 13 to 18).

Provision may also be made for the paint nozzle module 901 shown in FIG. 8 to be installed in the paint-spraying device 101 in FIGS. 1 to 7 and 9 to 19.

Although the present invention has been described with reference to preferred embodiments, workers skilled in the art will recognize that changes may be made in form and detail without departing from the spirit and scope of the invention.

LIST OF REFERENCE DESIGNATIONS

1 Paint nozzle module of 101
2 Nozzle opening
3 Needle
3*b* Rear end of 3
3*c* Collar of 3
4 Pressure spring of 3
5 Seal
5*a* Radially encircling groove
6 Nozzle element of 1
7 Paint infeed of 6
8 Needle guide
9 Interior space of 6
10 Prechamber of 90
11 Paint chamber of 9
12 Widened portion of 11
12*a* Front inner lateral surface of 12
12*b* Rear inner lateral surface of 12
13 Paint nozzle
14 Hollow cylindrical shell
15 Plate-like perforated disk
16 Inner lateral surface
17 Wall of 15
18 Front nozzle element portion
19 Rear flange
19*a* Outer step of 19
19*b* Inner step of 19
19*c* End face of 19*a*
19*d* End faces of 19*b*
20 Rear nozzle element portion
21 Front flange
21*a* Outer step
21*b* Inner step
21*c* End face of 21*a*
21*d* End faces of 21*b*
22 Displacement insert
23 Collar of 1
24*a*-24*c* Guide means of 1
25*a*-25*c* Groove on 1
26 lateral surface of 6
27 Shell opening of 6
51 Hole in 5

52 Inner edge of 5 around 51
53 Outer edge of 5
101 Paint spraying device
102 Compressed-air chamber of 101
201 Front end of 101
201*a* Main element of 201
202 Air cap
203 Sleeve nut
204 Receptacle
231 Outer flange
232 Inner flange
233 Container flange
234 Liquid flange
234*a* Sealing surface of 234
234*b* Paint feed opening of 234
235 Paint channel of 201*a*
241 Receiving space of 201*a*
242*a*-242*c* Centering means of 201*a*
243*a*-243*c* Stop means of 201
244*a*-244*c* Web of 201
245*a*-245*c* Rear surface of 244*a*-244*c*
301 Back end of 101
301*a* Main element of 301
302 Electric blower
303 Inlet on 301 for U
304 Trigger
305 Spring-loaded plunger
306 Transverse bolt
307 Bracing spring of 305
308 Thread of 301*a*
309 Connecting web of 301
331 Outer flange
332 Receiving flange
401 Paint container of 101
402 Air feed line
402*a* Feed opening of 402
403 Check valve
404 Interior space of 401
405 Air discharge line
406 Shut-off valve
407 Slide valve
408 Valve housing
409 Closure
410 Seal
410*a* Through bore
411*a*-411*c* First/second/third valve component
412 Riser pipe
901 Paint nozzle module (design variant)
903 Needle
905 Seal
922 Displacement insert
A Closed position of 3
a1, a2 First/second distance
B Intermediate position of 3
C Open position of 3
D5 Thickness of 5
E52, E53 Plane of 52 and 53 respectively
FS Paint jet
FSS Paint spray jet
KF5 Annular surface of 5
KF5*a* Front annular surface
KFSb Rear annular surface
L1 Longitudinal axis of 1
L201 Longitudinal axis of 201
SR Spraying direction
U Surroundings
VA11 Volume of 11 in the closed position A
VB11 Volume of 11 in the intermediate position B
VC11 Volume of 11 in the open position C
x Arrow direction

The invention claimed is:

1. A paint-spraying device for generating a paint spray jet,
wherein the paint-spraying device comprises a front end and a back end,
wherein the paint spraying device comprises a sleeve nut that secures the front end and the back end in a coupled position during a spray operation,
wherein the front end and the back end are configured to separate when can be separated by virtue of the back end and the front end are pulled apart,
wherein the front end comprises a paint container,
wherein the paint container comprises an air feed line that leads into the paint container,
wherein the air feed line comprises a check valve,
wherein the paint-spraying device comprises an air discharge line that is connected to the paint container,
wherein the sleeve nut securing the front end and the back end in the coupled position causes actuation of a shut-off valve to a closed position which closes the air discharge line.

2. The paint-spraying device as claimed in claim 1, wherein
the shut-off valve comprises an opening and a closure component,
the opening of the shut-off valve is formed on the front end, and
the closure component of the shut-off valve is formed on the back end.

3. The paint-spraying device as claimed in claim 1, wherein the shut-off valve is in an open position when the back end has been pulled from the front end.

4. The paint-spraying device as claimed in claim 1, wherein
the front end receives a paint nozzle module that comprises a nozzle element, a needle and a pressure spring,
the back end receives a plunger, a bracing spring and a trigger,
the bracing spring is stronger than the pressure spring, and the needle is forced by means of the plunger into a closed position, in which the needle closes a nozzle opening of the nozzle element, when the back end has been inserted into the front end,
the needle is forced by the pressure spring into an open position, in which the nozzle opening of the nozzle element is opened up by the needle, when the back end and the front end have been pulled apart, and
a spring travel of the bracing spring and the plunger are dimensioned such that, as the back end and the front end are pulled apart, the needle remains in the closed position until the shut-off valve is open.

5. A method for ventilating a paint container of a paint-spraying device that generates a paint spray jet, the method comprising:
obtaining the paint-spraying device, the paint-spraying device comprises a front end and a back end, wherein the front end and the back end are secured to one another with a sleeve nut,
actuating the sleeve nut to a first rotational position,
pulling the back end and the front end apart by a first distance corresponding to the first rotational position of the sleeve nut, such that a shut-off valve is at least partially opened, wherein the shut-off valve is formed on the front end as a valve housing and on the back end as a closure component, actuating the sleeve nut to a second rotational position different than the first rotational position, pulling the back end and the front end apart further by a further distance, corresponding to the second rotational position, such that a needle, which is received in the front end and closes a nozzle opening of a nozzle element, is released from the back end.

6. A paint-spraying device for generating a paint spray jet comprising:

a front end comprising a front main element, the front main element having a front outer flange and an inner flange, a paint nozzle module configured to be received by the inner flange of the front main element, a back end comprising a back main element, the back main element having a back outer flange and a receiving flange, wherein the front outer flange of the front main element of the front end is received by the receiving flange of the back main element of the back end such that the front end and the paint nozzle module are guided displaceably, in a manner secured against rotation, in the receiving flange of the back main element counter to a pressure force exerted on a needle of the paint nozzle module by a plunger, and is fixed in a manner dependent on a rotational position of a sleeve nut that is screwed onto a thread that forms the front outer flange of the front main element.

7. The paint-spraying device as claimed in claim 6, wherein the sleeve nut bears against the front main element of the front end via an air cap, and a bracing force introduced by the sleeve nut is transmitted via the inner flange of the front main element to the paint nozzle module and the needle thereof such that said bracing force acts as an opposing force in relation to the pressure force of the plunger.

8. The paint-spraying device as claimed in claim 6, wherein the paint nozzle module is received in a receiving space of the front main element, which is surrounded by the inner flange, such that the paint nozzle module is aligned with a longitudinal axis of the front end by a centering means of the front main element of the front end, in that the paint nozzle module bears by way of a collar against a stop means of the front main element of the front end in a spraying direction, and wherein the paint nozzle module is secured against rotation on the centering means by a guide means.

9. The paint-spraying device as claimed in claim 8, wherein the centering means is formed by at least two and in particular three webs which are aligned with the longitudinal axis of the front end and which project into the receiving space, in that the stop means of the front end is formed by rear surfaces of the webs, and in that the guide means of the paint nozzle module is formed by at least one groove in which one of the webs is received.

10. The paint-spraying device as claimed in claim 6, wherein the front main element of the front end comprises a container flange, wherein a paint container of the paint spraying device is screwed into the container flange of the front end.

11. The paint-spraying device as claimed in claim 6, wherein the front main element of the front end comprises a liquid flange, wherein the liquid flange comprises a sealing surface and a paint feed opening that is surrounded by the sealing surface, wherein the scaling surface is arranged in the region of the inner flange such that the sealing surface of the liquid flange bears against a lateral surface of a nozzle element of the paint nozzle module and the paint feed opening is situated opposite a shell opening of the nozzle element of the paint nozzle module.

12. The paint-spraying device as claimed in claim 6, wherein the back end comprises a valve component and the front end comprises a valve component, the components together form a shut-off valve, and a position that the components assume relative to one another is determined by the rotational position of the sleeve nut, and therefore a degree of opening of the shut-off valve is determined by the rotational position of the sleeve nut.

13. The paint-spraying device as claimed in claim 6, wherein the shut-off valve is open and pressure can escape from the paint container into the surroundings when the sleeve nut has been loosened, and wherein the shut-off valve is closed when the sleeve nut has been tightened.

14. The paint-spraying device as claimed in claim 6, wherein, as the sleeve nut is loosened, the shut-off valve opens before the loosening of the sleeve nut brings about a movement of the needle that causes a nozzle opening of the paint nozzle module to be opened.

15. The paint-spraying device as claimed in claim 6, wherein a riser pipe is configured to be of such a length that, when the paint container has been screwed into a container flange of the front end, the riser pipe extends to or into a paint infeed of the paint nozzle module such that the paint nozzle module and the riser pipe are connected to one another in liquid-tight fashion in order to conduct paint.

* * * * *